(12) United States Patent
Ito et al.

(10) Patent No.: US 10,655,031 B2
(45) Date of Patent: May 19, 2020

(54) INK JET INK COMPOSITION, INK ACCOMMODATION BODY AND INK JET RECORDING METHOD

(71) Applicant: Seiko Epson Corporation, Tokyo (JP)

(72) Inventors: Jun Ito, Shimosuwa-machi (JP); Mitsuaki Yoshizawa, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/888,837

(22) Filed: Feb. 5, 2018

(65) Prior Publication Data

US 2018/0155563 A1 Jun. 7, 2018

Related U.S. Application Data

(63) Continuation of application No. 13/853,149, filed on Mar. 29, 2013, now Pat. No. 9,884,975.

(30) Foreign Application Priority Data

May 29, 2012 (JP) ................................ 2012-121658
Nov. 8, 2012 (JP) ................................ 2012-246039

(51) Int. Cl.
*C09D 11/40* (2014.01)
*B41J 2/175* (2006.01)
(Continued)

(52) U.S. Cl.
CPC ........... *C09D 11/40* (2013.01); *B41J 2/17503* (2013.01); *B41J 2/17553* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045;
(Continued)

(56) References Cited

U.S. PATENT DOCUMENTS 6,733,113 B2 5/2004 Yoshizawa et al.
2006/0050116 A1 3/2006 Nakajima
(Continued)

FOREIGN PATENT DOCUMENTS

JP 2000-178488 A 6/2000
JP 2002-326976 A 11/2002
(Continued)

OTHER PUBLICATIONS

U.S. Appl. No. 13/853,149, filed Mar. 29, 2013, Ink Jet Composition, Ink Accomodation Body and Ink Jet Recording Method.

*Primary Examiner* — Manish S Shah
(74) *Attorney, Agent, or Firm* — Workman Nydegger

(57) ABSTRACT

An ultraviolet curing ink jet ink composition includes a trifunctional or tetrafunctional (meth)acrylate having a pentaerythritol skeleton; and inorganic metal-based fine particles as a color material, in which the viscosity is 8 to 22 mPa·s at 20° C.

16 Claims, 2 Drawing Sheets

(51) Int. Cl.
- *B41J 2/21* (2006.01)
- *C09D 11/322* (2014.01)
- *C09D 11/52* (2014.01)

(52) U.S. Cl.
CPC .......... *B41J 2/2107* (2013.01); *C09D 11/322* (2013.01); *C09D 11/52* (2013.01); *B41J 2002/17516* (2013.01)

(58) Field of Classification Search
CPC ......... C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | | |
|---|---|---|---|
| 2006/0155005 A1* | 7/2006 | Kondo | B41J 11/002 523/160 |
| 2007/0229612 A1 | 10/2007 | Oyanagi et al. | |
| 2007/0289484 A1 | 12/2007 | Yamaguchi et al. | |
| 2008/0076846 A1 | 3/2008 | Kito et al. | |
| 2008/0138519 A1 | 6/2008 | Habashi et al. | |
| 2008/0213518 A1 | 9/2008 | Oyanagi et al. | |
| 2008/0239045 A1* | 10/2008 | Umebayashi | C09D 11/101 347/102 |
| 2010/0080925 A1* | 4/2010 | Araki | C09D 11/101 427/511 |
| 2011/0229647 A1 | 9/2011 | Miura et al. | |
| 2012/0004385 A1 | 1/2012 | Kodama et al. | |
| 2012/0083545 A1 | 4/2012 | Kida et al. | |
| 2012/0133060 A1* | 5/2012 | Nakane | C09D 11/101 257/788 |
| 2012/0147103 A1* | 6/2012 | Hasegawa | B41J 2/17553 347/86 |
| 2013/0002773 A1* | 1/2013 | Fujii | B41J 2/2107 347/86 |
| 2013/0321520 A1 | 12/2013 | Ito et al. | |
| 2014/0128496 A1 | 5/2014 | Kida et al. | |
| 2014/0327716 A1 | 11/2014 | Miura et al. | |
| 2015/0225581 A1 | 8/2015 | Kida et al. | |
| 2015/0328893 A1 | 11/2015 | Miura et al. | |
| 2016/0214379 A1 | 7/2016 | Miura et al. | |

FOREIGN PATENT DOCUMENTS

| | | |
|---|---|---|
| JP | 2004-196936 A | 7/2004 |
| JP | 2006-027257 A | 2/2006 |
| JP | 2006-152278 A | 6/2006 |
| JP | 2009-083133 A | 4/2009 |
| JP | 2009-096910 A | 5/2009 |
| JP | 2009-138096 A | 6/2009 |
| JP | 2009-221282 A | 10/2009 |
| JP | 2010-100833 A | 5/2010 |
| JP | 2010-143982 A | 7/2010 |
| JP | 2011-190379 A | 9/2011 |
| JP | 2011-195649 A | 10/2011 |
| JP | 2012-017466 A | 1/2012 |
| JP | 2012-077221 A | 4/2012 |
| JP | 2012-092291 A | 5/2012 |
| WO | 2007/032399 A1 | 3/2007 |

* cited by examiner

INK JET INK COMPOSITION, INK ACCOMMODATION BODY AND INK JET RECORDING METHOD

CROSS REFERENCE TO RELATED APPLICATIONS

This application is a continuation of U.S. patent application Ser. No. 13/853,149, filed on Mar. 29, 2013, and claims priority to Japanese Patent Application Nos. JP 2012-246039 filed on Nov. 8, 2012 and JP 2012-121658 filed on May 29, 2012, all of which are hereby incorporated by reference in their entirety.

BACKGROUND

1. Technical Field

The present invention relates to an ink jet ink composition, an ink accommodation body and an ink jet recording method.

2. Related Art

In the related art, various systems have been used as recording methods for forming an image on a recording medium such as paper based on an image data signal. Among these, the ink jet system performs image formation directly on the recording medium by discharging ink onto only necessary image portions using a low cost apparatus, and therefore can use ink efficiently and has low running costs. Furthermore, since the ink jet system makes little noise, it is an excellent recording method.

In recent years, in order to form an image having high water resistance, solvent resistance, abrasion resistance and the like, an ultraviolet curing ink jet ink composition is being used which cures when irradiated with ultraviolet rays in a recording method of an ink jet system.

In addition, among the ultraviolet curing ink jet ink compositions, favorable shielding properties of the recorded object can be obtained when an ink composition containing inorganic metal-based fine particles is used. However, there is a problem in that the inorganic metal-based fine particles are apt to precipitate during storage of the ink.

For example, a white ink composition containing a hyperbranched polymer is disclosed in JP-A-2012-17466.

In addition, a cyan ink and a magenta ink containing caprolactone modified dipentaerythritol hexaacrylate are disclosed in JP-A-2009-83133.

However, at least one of the storage stability, the curing properties, the shielding properties and the precipitation properties have not yet reached a sufficient level in either of the inks disclosed in JP-A-2012-17466 or JP-A-2009-83133. In addition, there is no ink accommodation body with sufficient discharge stability and head durability that also has excellent recovery properties and durability.

SUMMARY

Therefore, an advantage of some aspects of the invention is to provide an ink composition having excellent storage stability, curing properties, shielding properties and precipitation resistance.

In addition, another advantage of some aspects of the invention is to provide an ink accommodation body with sufficient discharge stability and head durability that also has excellent recovery properties and durability.

As a result of careful examination, the inventors discovered that in an ink (an ink composition) which contains inorganic metal-based fine particles and has excellent shielding properties, since the precipitation resistance can be improved by setting the viscosity to a predetermined range or more, when the ink is prepared using a high viscosity polymerizable compound in which it is possible to perform viscosity adjustment to set the viscosity in this manner, a trifunctional or tetrafunctional (meth)acrylate having a pentaerythritol skeleton has excellent storage stability and curing properties. Furthermore, it was discovered that a appliciable ink jet ink composition can be obtained by incorporating the above polymerizable compound into a composition such that an ultraviolet curing ink jet ink composition with an ink composition viscosity of 8 to 22 mPa·s at 20° C. is obtained, thus completing the invention.

That is, aspects of the invention are as follows.

[1] An ultraviolet curing ink jet ink composition including a trifunctional or tetrafunctional (meth)acrylate having a pentaerythritol skeleton; and inorganic metal-based fine particles as a color material, in which the ultraviolet curing ink jet ink composition has a viscosity of 8 to 22 mPa·s at 20° C.

[2] The ultraviolet curing ink jet ink composition according to [1], in which the content of the trifunctional or tetrafunctional (meth)acrylate having the pentaerythritol skeleton is 5 to 15 mass % with respect to the ink composition.

[3] The ultraviolet curing ink jet ink composition according to [1] or [2], in which the content of the inorganic metal-based fine particles is 10 to 25 mass % with respect to the ink composition.

[4] The ultraviolet curing ink jet ink composition according to any one of [1] to [3], further including: a vinyl ether group-containing (meth)acrylic ester.

[5] The ultraviolet curing ink jet ink composition according to any one of [1] to [4], in which the trifunctional or tetrafunctional (meth)acrylate having the pentaerythritol skeleton contains at least one of pentaerythritol tri(meth)acrylate and pentaerythritol tetra(meth)acrylate.

[6] An ink accommodation body including: a container filled with an ultraviolet curing ink jet ink composition, in which the container is configured of a plastic film having an oxygen permeability of 5.0 cc·20 μm/(m²·day·atm) or less, and in which the ink filling the container is the ultraviolet curing ink jet ink composition according to any one of [1] to [5].

[7] An ink accommodation body including: a container filled with an ultraviolet curing ink jet ink composition, in which the container is configured of an ethylene-vinyl alcohol copolymer, and in which the ink filling the container is the ultraviolet curing ink jet ink composition according to any one of [1] to [5].

[8] The ink accommodation body according to [6] or [7], in which the dissolved oxygen content of the filled ultraviolet curing ink jet ink composition is 20 ppm or less.

[9] An ink jet recording method, in which recording is performed by discharging the ultraviolet curing ink jet ink composition according to any one of [1] to [5] from a head to a recording medium at 20° C. to 40° C.

[10] An ink jet recording method, in which recording is performed by discharging the ultraviolet curing ink jet ink composition according to any one of [1] to [5] from a head to a recording medium at 20° C. to 30° C. when the viscosity of the ink is 8 mPa·s or more and less than 15 mPa·s at 20° C., and at 30° C. to 40° C. when the viscosity of the ink is 15 mPa·s or more and 22 mPa·s or less at 20° C.

[11] The ink jet recording method according to [9] or [10], in which the dissolved oxygen content of the ultraviolet curing ink jet ink composition discharged from the head is 20 ppm or less.

[12] An ink accommodation body including: a container filled with an ink composition, in which the container is configured of a plastic film having an oxygen permeability of 5.0 cc·20 μm/(m² day·atm) or less, and in which the ink filling the container is an ultraviolet curing ink jet ink composition containing inorganic metal-based fine particles as a color material and having a viscosity of 8 to 22 mPa·s at 20° C.

[13] An ink accommodation body including: a container filled with an ink composition, in which the container is configured of an ethylene-vinyl alcohol copolymer, and in which the ink filling the container is an ultraviolet curing ink jet ink composition containing inorganic metal-based fine particles as a color material and having a viscosity of 8 to 22 mPa·s at 20° C.

BRIEF DESCRIPTION OF THE DRAWINGS

The invention will be described with reference to the accompanying drawings, in which like numbers reference like elements.

DESCRIPTION OF EXEMPLARY EMBODIMENTS

Figure 1:
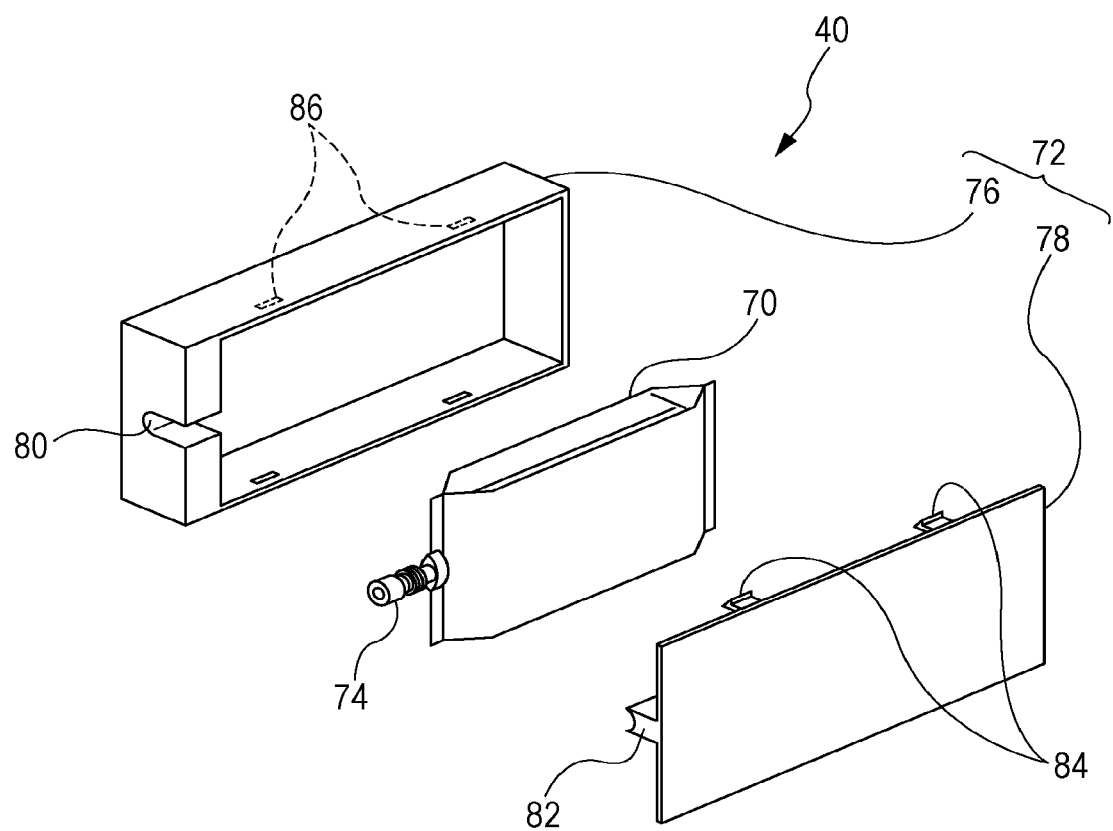
FIG. 1 is an exploded perspective view showing an example of the ink accommodation body of the invention.

Hereinafter, embodiments of the invention will be specifically described. Furthermore, the invention is not limited to the following embodiments, and various modifications thereof may be made within the spirit of the invention.

In the present specification, the term "curing properties" refers to the characteristic of curing as a response to light. The term "storage stability" refers to the characteristic of the difficulty for the viscosity to change before and after storage when storing an ink composition. The term "discharge stability" refers to the characteristic of discharging droplets of the ink composition from a nozzle in a constantly stable manner without the nozzle clogging. The term "shielding properties" refers to the difficulty for light to permeate a recorded object which was recorded using an ink. The term "precipitation resistance" refers to the difficulty for a component in the ink composition to precipitate during the storage of the ink composition. In the present specification, the term "(meth)acrylate" means at least one of an acrylate or the corresponding methacrylate, the term "(meth)acryl" means at least one of an acryl or the corresponding methacryl, and the term "(meth)acryloyl" means at least one of an acryloyl or the corresponding methacryloyl.

Ultraviolet Curing Ink Jet Ink Composition

The ink composition (the ink) of the present embodiment is an ultraviolet curing ink composition which cures through the irradiation of ultraviolet rays. In addition, it is the ink jet ink composition used by the ink jet recording apparatus. The term "ink jet ink composition" refers to an ink made commercially available for ink jet printers.

Viscosity of Ink Composition at 20° C.

The viscosity of the ink composition according to the present embodiment is 8 to 22 mPa·s at 20° C. By setting the viscosity to 8 mPa·s or more at 20° C., during the long-term storage of the ink, it is possible to improve the precipitation resistance by preventing precipitation of the inorganic metal-based fine particle component, which has a comparatively high specific weight contained in the ink and is apt to precipitate. In addition, the storage stability of the ink can be increased by setting the viscosity to 22 mPa·s or less at 20° C. in order to increase the viscosity of the ink, and by restricting the content of high viscosity components such as polyfunctional monomers, high polymer polymerizable compounds, or the like contained in the ink. This is because these components tend to have inferior storage stability in comparison with polymerizable monomers with few functional groups (two functional groups or less). The viscosity of the ink at 20° C. is preferably 15 to 22 mPa·s since the precipitation resistance can be further improved. However, 8 to 15 mPa·s is preferable, since the storage stability can be made even more excellent.

Furthermore, the merits described below may also be achieved by setting the viscosity of the ink to the ranges described above. First, when the viscosity of the ink is within or less than the above ranges, it is easy to set the viscosity of the ink to a viscosity at which it is possible to discharge the ink from the head in a stable manner during the discharge step described below which discharges the ink from the head at a discharge temperature within a predetermined temperature range (20° C. to 40° C.) described below. In addition, in comparison to when an ink with a high viscosity is used, when an ink with a low viscosity is used, there is a tendency for the degradation of the members of the head to be greater and the durability of the head to be inferior. An ink with a low viscosity contains a larger amount of polymerizable compounds having a comparatively low viscosity such as monofunctional monomers. This is considered to be related to the observation that there is a tendency for the durability of the head to be degraded when using an ink which contains a large amount of polymerizable compounds having a comparatively low viscosity, in comparison to an ink which does not. Meanwhile, a tendency was observed in which the higher the discharge temperature of the ink, the more the durability of the head is degraded. This is considered to be because, the higher the temperature is, the greater the effect of the ink degrading the members of the head. By setting the viscosity of the ink to the ranges described above, it is possible to prevent the degradation of the head durability caused by the ink, therefore, it is not necessary to lower the viscosity by setting the discharge temperature to over 40° C. in order to set the viscosity of the ink to an appropriate viscosity for discharging from the head, and it is possible to prevent the degradation of the head durability caused by the discharge temperature.

Furthermore, a tendency was observed for more cure wrinkling to occur in the cured object after ink curing when an ink having low viscosity is used, in comparison to when an ink having high viscosity is used. This is considered to be related to the fact that an ink with a low viscosity contains a larger amount of polymerizable compounds having a comparatively low viscosity such as monofunctional monomers, and the occurrence of cure wrinkling is more prominent when using an ink which contains a large amount of polymerizable compounds having a comparatively low viscosity, in comparison to an ink which does not. In regard to the occurrence of cure wrinkling, the principle of the occurrence of cure wrinkling is speculated to be as follows, however, the scope of the invention is not limited to the following speculation in any manner. Cure wrinkling is speculated to occur according to the following. In the coating film of the ink, the surface of the coating film cures first, when the inner portion of the coating film subsequently cures later than the surface of the coating film, the surface of the coating film which cured first deforms, the ink of the inner portion of the coating film flows irregularly in the period until the ink subsequently cures, or the like. In addition, a tendency was observed for there to be a great polymerization shrinkage (the difference between the volume of an ink before curing and the volume of the ink after curing (the cured object), where the ink before curing has a predetermined mass) which accompanies the curing in an ultraviolet curing ink having a low viscosity. It is speculated that this causes the occurrence of cure wrinkling to be prominent. Therefore, it is possible to obtain an ink having excellent cure wrinkling suppression by setting the viscosity of the ink to the ranges described above or higher. Furthermore, in an ultraviolet curing ink containing the monofunctional (meth)acrylates described below, particularly the vinyl ether group-containing (meth)acrylate represented by General Formula (I), while the curing properties are excellent, a tendency was observed for cure wrinkling to occur easily. In the ink of the present embodiment, even when these components are contained, by setting the viscosity to the ranges described above, it is possible to effectively prevent the occurrence of cure wrinkling.

Furthermore, for the viscosity in the present specification, a value measured using the method performed in the examples described below is used. However, this does not mean that the measurement method of the viscosity is limited thereto, and it is possible to use any well-known measurement method.

Among such methods, the viscosity of the ink in the present embodiment may be measured by using an E-type viscometer in particular. When using the E-type viscometer, it is within the realm of common knowledge to perform measurement in accordance with the operation manual of the viscometer. Therefore, it is needless to say that measurement is performed by setting the type and the rotation speed of the rotor in accordance with the operation manual such that the viscosity of the ink to be measured may be measured normally. Further, it is clear that in the present embodiment too, measurement is performed by setting the viscosity of the ink in accordance with the operation manual such that the viscosity of the ink to be measured may be measured normally.

Viscosity Engineering Method

In the ink composition of the present embodiment, when the ink contains various components, the viscosity described above may be satisfied across the entirety of the ink composition which is a mixture of the contained components. Here, in order to obtain an ink composition of such a viscosity, description will be given of a method of engineering the ink such that the viscosity of the ink is within a desired range.

The viscosity of the mixture of all the polymerizable compounds contained in the ink may be predicted from the viscosity of each of the polymerizable compounds used, and the mass ratio of each of the polymerizable compounds with respect to the ink composition.

The ink is assumed to contain N types of polymerizable compound, as in, polymerizable compounds A, B . . . (omission) . . . , N. The viscosity of the polymerizable compound A is represented by VA, and the mass ratio of the polymerizable compound A with respect to the total amount of polymerizable compounds in the ink is represented by MA. The viscosity of the polymerizable compound B is represented by VB, and the mass ratio of the polymerizable compound B with respect to the total amount of polymerizable compounds in the ink is represented by MB. Similarly, the viscosity of the polymerizable compound N, which is the N-th compound, is represented by VN, and the mass ratio of the polymerizable compound N with respect to the total amount of polymerizable compounds in the ink is represented by MN. To confirm, this means that the formula "MA+MB+ . . . (omission) . . . +MN=1" is true. In addition, the viscosity of the mixture of all the polymerizable compounds contained in the ink is represented by VX. Therefore, it is assumed that Expression (1) below is satisfied.

$$MA \times \mathrm{Log}\ VA + MB \times \mathrm{Log}\ VB + \ldots \text{(omission)} \ldots + MN \times \mathrm{Log}\ VN = \mathrm{Log}\ VX \quad (1)$$

Furthermore, when there are two types of polymerizable compound in the ink, for example, the mass ratios of the polymerizable compounds succeeding MB are zero. The number of types of polymerizable compound may be set to an arbitrary number of one or more.

Next, description will be given of an example of the method (steps 1 to 7) for setting the viscosity of the ink to be within a desired range.

First, information of the viscosity of each of the polymerizable compounds used at a predetermined temperature is obtained (step 1). Examples of the method of obtaining such information include obtaining the information from the makers catalog or the like, measuring the viscosity of each of the polymerizable compounds at a predetermined temperature, or the like. There is a case in which the viscosity of the polymerizable compound monomers differs according to the maker, even when they are the same polymerizable compound, therefore the viscosity information according to the maker of the polymerizable compounds to be used may be adopted.

Next, a target viscosity is set for VX, and the composition ratios (the mass ratios) of each of the polymerizable compounds are determined such that VX becomes the target viscosity, on the basis of Expression (1) (step 2). The target viscosity is the ultimately desirable viscosity of the ink composition, and is set to a viscosity within the range of 8 to 22 mPa·s. The predetermined temperature is set to 20° C.

Next, a composition (hereinafter, referred to as the "polymerizable composition") of the polymerizable compounds is prepared by actually mixing the polymerizable compounds, and the viscosity is measured at the predetermined temperature (step 3).

Next, when the viscosity of the polymerizable composition is approximately close to the target viscosity (in the present step 4, this may be "target viscosity±5 mPa·s"), an ink composition containing the polymerizable composition and components other than the polymerizable compounds such as photoinitiators and pigments (hereinafter, referred to as "components other than the polymerizable compounds") is prepared, and the viscosity of the ink composition is measured (step 4). In step 4, when a component other than the polymerizable compounds is present, such as a component which is mixed into the ink composition in the form of, for example, a pigment dispersion as with a pigment, polymerizable compounds already contained in the pigment dispersion are also introduced into the ink composition. Therefore, it is necessary to adjust the ink composition by the mass ratio obtained by subtracting the mass ratio of the polymerizable compounds introduced into the ink composition as the pigment dispersion from the composition ratios of each of the polymerizable compounds determined in step 2.

Next, the difference between the measured viscosity of the ink composition and the measured viscosity of the polymerizable composition is calculated and set to VY (step 5).

Here, normally "VY>0". In regard to VY, while dependent upon the content conditions such as the types and content of the components other than the polymerizable compounds, in the examples described below, VY=3 to 5 mPa·s.

Next, "the target viscosity of step 2—VY" is set for VX, and, from Expression (1), the composition ratios of each of the polymerizable compounds are determined again, such that VX becomes "the target viscosity of step 2—VY" (step 6).

Next, an ink composition is prepared by mixing each of the polymerizable compounds and the components other than the polymerizable compounds at the composition ratios determined in step 6, and the viscosity is measured at the predetermined temperature (step 7). When the viscosity measured is the target viscosity, this means that the ink composition prepared in step 7 is obtained as an ink composition having the target viscosity.

Meanwhile, in step 3, when the measured viscosity of the composition of the polymerizable compounds which was prepared is not within the range "target viscosity±5 mPa·s", the process returns to step 3 to be performed again after performing the following fine adjustments. First, when the measured viscosity is too high, fine adjustment is performed in which the content of polymerizable compounds having a higher viscosity than the target viscosity on their own is reduced, and the content of polymerizable compounds having a lower viscosity than the target viscosity on their own is increased. However, when the measured viscosity is too low, fine adjustment is performed in which the content of polymerizable compounds having a lower viscosity than the target viscosity on their own is reduced, and the content of polymerizable compounds having a higher viscosity than the target viscosity on their own is increased. In addition, in step 7, when the measured viscosity of the prepared ink composition is not the target viscosity, the process returns to step 7 to be performed again after performing the same adjustments as in the fine adjustments described above.

Ink Accommodation Body

Another embodiment of the present invention relates to an ink accommodation body which accommodates a predetermined ultraviolet curing ink jet ink composition. The ink accommodation body is used for the storage and transport of the ink composition before the ink composition is used in an ink jet recording apparatus, and supplies the ink composition accommodated in the ink accommodation body to the recording apparatus when the ink composition is to be used. The ink accommodation body will be described in detail below.

Hereinafter, description will be given of an additive (a component) which is, or may be, contained in the ink composition in the present embodiment.

Polymerizable Compound

The polymerizable compound contained in the ink composition is polymerized when irradiated with light alone, or by the action of a photoinitiator described below, and is capable of causing the printed ink to cure.

Pentaerythritol Skeleton Trifunctional or Tetrafunctional (Meth)Acrylate

For the polymerizable compound, the ink composition contains a trifunctional or tetrafunctional (meth)acrylate having a pentaerythritol skeleton. The (meth)acrylate has one or more pentaerythritol skeleton (the skeleton portion within the pentaerythritol: $C(CH_2-O-)_4$ residue) within its molecule, and is a compound having three or four (meth)acrylate groups within its molecule as polymeric functional groups. The compound is favorable from the viewpoint of setting the viscosity of an ink having a high viscosity to within a predetermined range, and the curing properties and the storage stability of the ink are excellent. While not limited to the following, examples of the (meth) acrylate include pentaerythritol tri (meth)acrylate, pentaerythritol tetra (meth)acrylate, ethylene oxide-modified pentaerythritol tri (meth)acrylate, ethylene oxide-modified pentaerythritol tetra (meth)acrylate, propylene oxide-modified pentaerythritol tri (meth)acrylate, propylene oxide-modified pentaerythritol tetra (meth)acrylate, caprolactone-modified pentaerythritol tri (meth)acrylate, and caprolactone-modified pentaerythritol tetra (meth)acrylate. In addition, compounds having a pentaerythritol skeleton formed from a plurality of pentaerythritol residues may also be used, and examples thereof include tri (meth)acrylate, tetra (meth)acrylate, ethylene oxide-modified tri (meth)acrylate, ethylene oxide-modified tetra (meth)acrylate, propylene oxide-modified tri (meth)acrylate, propylene oxide-modified tetra (meth)acrylate, caprolactone-modified tri (meth)acrylate or caprolactone-modified tetra (meth)acrylate of dipentaerythritol or tripentaerythritol.

The (meth)acrylates are capable of imparting precipitation resistance to an ink since the (meth)acrylates has an increased viscosity. From a viewpoint of the curing properties, the storage stability and the ease of adjusting the viscosity of the ink composition, it is preferable to use pentaerythritol tri (meth)acrylate or pentaerythritol tetra (meth)acrylate, and it is more preferable to use pentaerythritol tri (meth)acrylate. One type of the (meth)acrylate may be used alone, and two or more types may also be used. The content of the (meth)acrylate is preferably 3 to 18 mass % with respect to the total mass (100 mass %) of the ink composition, and more preferably from 5 to 15 mass %. When the content is within the above ranges, it is possible to obtain an ink which is even more excellent from a viewpoint of the ease of viscosity adjustment, the storage stability and the curing properties.

Other Polymerizable Compounds

The ink composition of the present embodiment may also contain other polymerizable compounds than the trifunctional or tetrafunctional (meth)acrylate having a pentaerythritol skeleton. Of the other polymerizable compounds, a description will be given of the polymerizable compounds other than the vinyl ether group-containing (meth)acrylic esters described below.

Vinyl Ether Group-Containing (Meth)Acrylic Esters

For the other polymerizable compounds, the ink composition may also contain the vinyl ether group-containing (meth)acrylic ester represented by General Formula (I) below.

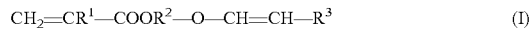

$$CH_2=CR^1-COOR^2-O-CH=CH-R^3 \qquad (I)$$

(in the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.)

By containing the vinyl ether group-containing (meth) acrylic ester, the ink composition may obtain excellent curing properties of the ink and may further reduce the viscosity of the ink. Furthermore, in comparison to using a compound having a vinyl ether group and a compound having a (meth)acryl group separately, it is preferable to use a compound having a vinyl ether group and a (meth)acryl group together in the same molecule from a viewpoint of obtaining favorable curing properties of the ink.

In the General Formula (I), favorable examples of the divalent organic residue having 2 to 20 carbon atoms represented by $R^2$ include a linear, branched or annular alkylene group which has 2 to 20 carbon atoms and may be substituted, an alkylene group which has oxygen atoms in the structure through one or both of ether bonding and ester bonding, may be substituted, and has 2 to 20 carbon atoms, and a divalent aromatic group which has 6 to 11 carbon atoms and may be substituted. Among these, examples which may be used favorably include ethylene groups; alkylene groups having 2 to 6 carbon atoms such as n-propylene groups, isopropylene groups and butylene groups; and alkylene groups which have 2 to 9 carbon atoms and have an oxygen atom in the structure through ether bonding such as oxyethylene groups, oxy-n-propylene groups, isopropylene oxy groups and oxybutylene groups.

In General Formula (I), favorable examples of the monovalent organic residue having 1 to 11 carbon atoms represented by $R^3$ include linear, branched or annular alkyl groups which have 1 to 10 carbon atoms and may be substituted, and aromatic groups which have 6 to 11 carbon atom and may be substituted. Among these, examples which may be used favorably include alkyl groups which are methyl groups or ethyl groups and have 1 to 2 carbon atoms, and aromatic groups such as phenyl groups and benzene groups which have 6 to 8 carbon atoms.

In the case of a group in which each of the organic residue described above may be substituted, the substituents thereof may be divided into groups that contain carbon atoms and groups that do not contain carbon atoms. First, when the substituent is a group that contains carbon atoms, the carbon atoms are counted in the carbon number of the organic residue. While not limited to the following, examples of groups that contain carbon atoms include, for example, carboxy groups and alkoxy groups. While not limited to the following, examples of groups that do not contain carbon atoms include, for example, hydroxyl groups and halo groups.

While not limited to the following, examples of the vinyl ether group-containing (meth)acrylic esters include, for example, 2-vinyloxyethyl (meth)acrylate, 3-vinyloxypropyl (meth) acrylate, 1-methyl-2-vinyloxyethyl (meth)acrylate, 2-vinyloxypropyl (meth)acrylate, 4-vinyloxybutyl (meth) acrylate, 1-methyl-3-vinyloxypropyl (meth)acrylate, 1-vinyloxymethylpropyl (meth) acrylate, 2 methyl-3-vinyloxypropyl (meth)acrylate, 1,1-dimethyl-2-vinyloxyethyl (meth) acrylate, 3-vinyloxybutyl (meth)acrylate, 1-methyl-2-vinyloxypropyl (meth)acrylate, 2-vinyloxybutyl (meth) acrylate, 4-vinyloxymethyl cyclohexyl (meth)acrylate, 6-vinyloxyvinylhexyl (meth)acrylate, 4-vinyloxymethyl cyclohexylmethyl (meth)acrylate, 3-vinyloxymethyl cyclohexylmethyl (meth)acrylate, 2-vinyloxymethyl cyclohexylmethyl (meth)acrylate, p-vinyloxymethyl phenylmethyl (meth)acrylate, m-vinyloxymethyl phenylmethyl (meth) acrylate, o-vinyloxymethyl phenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxy)ethyl (meth)acrylate, 2-(isopropenoxyethoxyethoxyethoxy)ethyl (meth) acrylate, polyethyleneglycol monovinylether (meth)acrylate, and polypropyleneglycol monovinylether (meth)acrylate.

Among these, 2-(vinoxyetoxy)ethyl (meth)acrylate may be used favorably since the viscosity of the ink may be lowered, the ignition point increased and excellent curing properties obtained. That is, it is preferable to use at least one of 2-(vinyloxyethoxy)ethyl acrylate and 2-(vinyloxyethoxy) ethyl methacrylate, and it is more preferable to use 2-(vinyloxyethoxy)ethyl acrylate. In particular, since 2-(vinyloxyethoxy)ethyl acrylate and 2-(vinyloxyethoxy)ethyl methacrylate both have a simple structure and a small molecular weight, the viscosity of the ink may be more prominently lowered. Examples of the 2-(vinyloxyethoxy) ethyl (meth)acrylate include 2-(2-vinyloxyethoxy)ethyl (meth)acrylate and 2-(1-vinyloxyethoxy)ethyl (meth)acrylate, and examples of the 2-(vinyloxyethoxy)ethyl acrylate include 2-(2-vinyloxyethoxy)ethyl acrylate and 2-(1-vinyloxyethoxy)ethyl acrylate. Furthermore, 2-(vinyloxyethoxy) ethyl acrylate is excellent from a perspective of the curing properties, in comparison to 2-(vinyloxyethoxy)ethyl methacrylate.

One type of vinylether group-containing (meth)acrylate ester may be used alone, and two types or more may also be used together.

The content of the vinylether group-containing (meth) acrylate ester, in particular 2-(vinyloxy)ethyl (meth)acrylate with respect to the total mass (100 mass %) of the ink composition is preferably 10 to 70 mass %, more preferably 20 to 60 mass % and yet more preferably 30 to 50 mass %. When the content is within the above ranges, it is possible to obtain an ink having even more excellent curing properties and storage stability.

While not limited to the following, examples of the manufacturing method of vinylether group-containing (meth)acrylate esters include a method of esterifying a (meth)acrylic acid and a hydroxyl group-containing vinylether (manufacturing method B), a method of esterifying a (meth)acrylic acid halide and a hydroxyl group-containing vinylether (manufacturing method C), a method of esterifying a (meth)acrylic acid anhydride and a hydroxyl group-containing vinylether (manufacturing method D), a method of interesterifying a (meth)acrylic acid ester and a hydroxyl group-containing vinylether (manufacturing method E), a method of esterifying a (meth)acrylic acid and a halogen-containing vinylether (manufacturing method F), a method of esterifying a (meth)acrylic acid alkali (earth) metal salt and a halogen-containing vinylether (manufacturing method G), a method of performing vinyl interchange between a hydroxy-containing (meth)acrylic acid ester and a vinyl carboxylate (manufacturing method H), and a method of esterifying a hydroxy-containing (meth)acrylic ester and an alkylvinylether (manufacturing method I).

Among these, the manufacturing method E is preferable, since it is possible to further exhibit the desired effects of the present embodiment.

Polymerizable Compounds Other than Those Above

It is possible to use various well-known monomers and oligomers such as monofunctional, difunctional and polyfunctional groups which are trifunctional or of a higher order as the polymerizable compounds other than the other polymerizable compounds described above. Examples of the monomers include, for example, unsaturated carboxylic acids such as (meth)acrylic acid, itaconic acid, crotonic acid, isocrotonic acid and maleic acid, and salts thereof; ester, urethane, amide, and anhydrides thereof; and acrylonitrile, styrene, various unsaturated polyesters, unsaturated polyethers, unsaturated polyamides and unsaturated urethanes. In addition, examples of the oligomers include, for example, oligomers formed from the monomers such as linear acryl oligomers; epoxy (meth)acrylate, oxetane (meth)acrylate, aliphatic urethane (meth)acrylate, aromatic urethane (meth)acrylate and polyester (meth)acrylate.

In addition, an N-vinyl compound may also be contained as the other monofunctional monomer or polyfunctional monomer. Examples of the N-vinyl compound include N-vinyl formamide, N-vinyl carbazole, N-vinyl acetamide, N-vinyl pyrrolidone, N-vinyl caprolactam, acryloyl morpholine, and the derivatives thereof.

Among the other polymerizable compounds, an ester of (meth)acrylic acid, that is, a (meth)acrylate is preferable.

Among the (meth)acrylates, examples of monofunctional (meth)acrylates include, for example, isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-di glycol (meth)acrylate, 2-hydroxybutyl (meth)acrylate, butoxyethyl (meth)acrylate, ethoxy-diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate and dicyclopentenyloxyethyl (meth)acrylate. Among these, phenoxyethyl (meth)acrylate and benzyl (meth)acrylate are preferable.

Among the (meth)acrylates, examples of difunctional (meth)acrylates include, for example, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, EO (ethylene oxide) adduct di(meth)acrylate of bisphenol A, PO (propylene oxide) adduct di(meth)acrylate of bisphenol A, hydroxypivalic acid neopentyl glycol di(meth)acrylate and polytetramethylene glycol di(meth)acrylate. Among these, dipropylene glicol (meth)acrylate is preferable.

Among the (meth)acrylates, examples of polyfunctional (meth)acrylates having three or more functional groups include, for example, trimethylolpropan tri(meth)acrylate, EO-modified trimethylolpropan tri(meth)acrylate, dipentaerythritol hexa(meth)acrylate, ditrimethylolpropan tetra(meth)acrylate, glycerin propoxy tri(meth)acrylate, caprolactone-modified trimethylolpropan tri(meth)acrylate and caprolactam-modified dipentaerythritol hexa(meth)acrylate.

Among these, it is possible for the other polymerizable compounds to contain a monofunctional (meth)acrylate. In this case, the solubility of the photoinitiator and other additives is excellent and it is easy to obtain discharge stability during the ink jet recording. Furthermore, since the toughness, the heat resistance and the chemical resistance of the coating film increase, it is preferable to use a monofunctional (meth)acrylate and a difunctional (meth)acrylate together, and among these, it is more preferable to use a phenoxyethyl (meth)acrylate and a dipropylene glycol di(meth)acrylate together.

One type of the other polymerizable compound may be used alone or two or more types may be used together.

The content of the other polymerizable compounds with respect to the total mass (100 mass %) of the ink composition is preferably 5 to 85 mass %, and more preferably from 15 to 80 mass %. When the content is within the above ranges, it is possible to reduce the viscosity and the odor, as well as to obtain excellent solubility and reaction properties of the photoinitiator.

Among the other polymerizable compounds, the content of the monofunctional (meth)acrylate (this includes when the ink contains the vinylether group-containing (meth)acrylate described above which is a monofunctional (meth)acrylate) with respect to the total mass (100 mass %) of the ink composition is preferably 40 to 80 mass %, and more preferably 50 to 70 mass %.

In addition, the content of a monofunctional (meth)acrylate other than the vinylether group-containing (meth)acrylate with respect to the total mass (100 mass %) of the ink composition is preferably 10 to 50 mass %, and more preferably 20 to 40 mass %. The ink contains these compounds having a comparatively low viscosity. Therefore, it is easy to obtain a preferable viscosity of the ink when the compounds are used together with a trifunctional or tetrafunctional (meth)acrylate which has a comparatively high viscosity and a pentaerythritol skeleton, and, even more excellent curing properties of the ink, solubility of components such as the photoinitiator, and storage stability may be obtained.

When the ink contains a difunctional or higher order (meth)acrylate other than the trifunctional or tetrafunctional (meth)acrylate having a pentaerythritol skeleton, the content thereof with respect to the total mass (100 mass %) of the ink composition is preferably 2 to 20 mass %, and more preferably 5 to 15 mass %.

Polymerization Inhibitors

The ink composition may include a hindered amine compound, p-methoxyphenol, monomethylether hydroquinone (MEHQ), hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol) and 4,4'-thiobis(3-methyl-6-t-butylphenol) as a polymerization inhibitor.

One type of polymerization inhibitor may be used alone, and two types or more may also be used together. The content of other polymerization inhibitors is not particularly limited, however, it may be, for example, 0.01 to 0.5 mass % in the ink composition.

Photoinitiators

The ink composition may further contain a photoinitiator. The photoinitiator is used in order to cure the ink present on the surface of the recording medium using photopolymerization through the emission of ultraviolet rays, thereby forming printed characters. By using ultraviolet rays (UV) specifically among the various types of radiation, it is possible to obtain excellent safety and to suppress the cost of the light source lamp. There are no particular limitations, as long as the photoinitiator generates active radicals, cations, and the like by the energy of the light (the ultraviolet rays) and initiates the polymerization of the polymerizable compound. However, it is possible to use a light radical polymerization initiator or a light cation polymerization initiator, and of those, it is preferable to use the light radical polymerization initiator.

Examples of the light radical polymerization initiators include, for example, aromatic ketones, acylphosphine oxide compounds, aromatic onium salt compounds, organic peroxides, thio compounds (thioxanthone compounds, thiophenyl group-containing compounds and the like), a-aminoalkylphenone compounds, hexaarylbiimidazole compounds, ketoxime ester compounds, borate compounds, azinium compounds, metallocene compounds, active ester compounds, compounds having carbon-halogen bonds, and alkylamine compounds.

Among these, since even more excellent curing properties of the ink may be obtained, it is preferable to use the thioxanthone compounds, and more preferable to use a mixture of the acylphosphine oxide compound and the thioxanthone compound.

Specific examples of the light radical polymerization initiator include acetophenone, acetophenonebenzyl ketal, 1-hydroxycyclohexylphenyl ketone, 2,2-dimethoxy-2-phenylaceto phenone, xanthone, fluorenone, benzaldehyde, fluorene, anthraquinone, triphenylamine, carbazole, 3-methylacetophenone, 4-chloro benzophenone, 4,4'-dimethoxy benzophenone, 4,4'-diamino benzophenone, Michler's ketone, benzoinpropyl ether, benzoinethyl ether, benzyldimethyl ketal, 1-(4-isopropyl-phenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio) phenyl]-2-morpholino-propan-1-one, bis(2,4,6-trimethylbenzoyl)-phenylphosphine oxide, 2,4,6-trimethylbenzoyl-diphenyl-phosphine oxide, 2,4-diethylthioxanthone, and bis(2,6-dimethoxybenzoyl)-2,4,4-trimethylpentylphosphine oxide.

Among these, it is preferable to use diethylthioxanthone, since it is possible to efficiently convert a wide range of ultraviolet light (UV light) into an active type thereof.

Examples of commercially available light radical polymerization initiators include, for example, IRGACURE 651 (2,2-dimethoxy-1,2-diphenyl-ethane-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]-phenyl}-2-methyl-propan-1-one), IRGACURE 907 (2-methyl-1-(4-methylthiophenyl)-2-morpholinopropan-1-one) IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl) phenyl]-1-butanone), DAROCUR TPO (2,4,6-trimethylbenzoyl-diphenyl-phosphine oxide), IRGACURE 819 (bis(2,4,6-trimethyl benzoyl)-phenyl phosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1,2-octanedione, 1-[4-(phenylthio)-, 2-(o-benzoyloxime)]), IRGACURE OXE 02 (ethanone, 1-[9-ethyl-6-(2-methyl-benzoyl)-9H-carbazol-3-yl]-, 1-(o-acetyloxime)), IRGACURE 754 (a mixture of oxyphenyl acetic acid, 2-[2-oxo-2-phenylacetoxyethoxy]ethylester and oxy-phenyl-acetic acid, 2-(2-hydroxyethoxy)ethyl ester) (all manufactured by BASF); Speedcure TPO, Speedcure DETX (2,4-diethyl thioxanthone), Speedcure ITX (2-isopropylthioxanthone) (all manufactured by Lambson Ltd.); KAYACURE DETX-S (2,4-diethylthioxanthone) (manufactured by Nippon Kayaku Co., Ltd.); Lucirin TPO, LR8893, LR8970 (all manufactured by BASF); and EBECRYL P36 (manufactured by UCB).

One type of the photoinitiator may be used alone, and two types or more may also be used together.

The content of the photoinitiator with respect to the total mass (100 mass %) of the ink composition is preferably 5 to 20 mass %, and more preferably from 8 to 15 mass %. When the content is within the above ranges, it is possible to exhibit a sufficient ultraviolet ray curing speed, and to avoid coloring caused by an insoluble residue of the photoinitiator or the photoinitiator.

In particular, it is preferable for the photoinitiator contained in the ink composition to be an acylphosphine oxide-based compound, since when this is the case, more excellent curing properties of the ink may be obtained. The content of the acylphosphine oxide-based compound with respect to the total mass (100 mass %) of the ink composition is preferably 7 to 15 mass %, and more preferably from 8 to 12 mass %.

Furthermore, it is possible to omit the addition of the photoinitiator by using a photopolymerizable compound as the polymerizable compound described above. However, it is possible to easily adjust the initiation of polymerization when a photoinitiator is used, thereby it is favorable to do so.

Color Material

The ink composition contains inorganic metal-based fine particles as the color material. Examples of the inorganic metal-based fine particles include metal compound fine particles such as metal oxides, metal carbonates and metal sulfates; and metal fine particles such as metals and alloys. The ink contains the inorganic metal-based fine particles. Therefore, the shielding properties of the recorded object (the recording medium to which was recorded) may be increased. For example, even in a case in which a pattern is formed on a transparent recording medium using the ink composition of the present embodiment, it is possible to increase the shielding properties of the recording medium by forming a pattern having excellent shielding properties. When the ink contains the metal compound fine particles as the inorganic metal-based fine particles, it is possible to make the ink a white ink, and when the ink contains the metal fine particles as the inorganic metal-based fine particles, it is possible to make the ink metallic, thereby it is possible to form a pattern of these colors to the recording medium. In particular, a white pattern may be formed on the recording medium by making the ink a white ink which contains the metal compound fine particles as the inorganic metal-based fine particles, and a highly saturated color image recorded object may be obtained by forming a color pattern onto the white pattern using color ink.

Examples of the metal compound fine particles include fine particles of metal oxides such as titanium oxide, silicon oxide, aluminum oxide, magnesium oxide, and zinc oxide; calcium carbonate and barium sulfate. Examples of the metal fine particles include fine particles of aluminum, silver, gold, titanium and alloys thereof. When metal fine particles are used, it is preferable to use metal fine particles in which the surface of the fine particles of a predetermined average particle diameter obtained through a milling process or the like is surface treated with a silicon compound.

From a viewpoint of the shielding properties and precipitation resistance, the average particle diameter of the inorganic metal-based fine particles is preferably 150 to 350 nm, more preferably 180 to 280 nm and even more preferably 200 to 250 nm. Here, the average particle diameter in the present specification is measured using a dynamic light scattering method and is the volume average particle diameter.

From a viewpoint of the shielding properties and precipitation resistance, the content of the inorganic metal-based fine particles in the ink composition is preferably 2 to 25 mass %, more preferably 5 to 23 mass % and even more preferably 8 to 20 mass %. When the ink contains the inorganic metal-based fine particles, the shielding properties of the recorded object may be improved. However, since there is a tendency for the precipitation resistance of the ink to deteriorate due to the viscosity of the inorganic metal-based fine particles being high, the ink composition of the present embodiment is particularly applicable.

The ink composition of the present embodiment, in addition to the inorganic metal-based fine particles, may further contain color materials such as other pigments and dyes.

Dispersant

In order to improve the dispersibility of the inorganic metal-based fine particles in the ink composition, a dispersant may also be contained. As the dispersant, there are no particular limitations, however for example, a dispersant typically used to prepare a pigment dispersion such as a polymeric dispersant may be used. Specific examples include dispersants with one or more types of polyoxyalkylene polyalkylene polyamines, vinyl-based polymers and copolymers, acrylic-based polymers and copolymers, polyesters, polyamides, polyimides, polyurethanes, amino-based polymers, silicon-containing polymers, sulfur-containing polymers, fluorine-containing polymer, and epoxy resins as the main component. Examples of commercially available polymer dispersants include the Ajisper series manufactured by Ajinomoto Fine-Techno Co., Inc., the Solsperse series (Solsperse 36000 and the like) which may be obtained from Avecia Inc. or Noveon, the Dispervic series manufactured by BYK-Chemie Japan Co., Ltd., and the Disparon series manufactured by Kusumoto Chemicals, Ltd.

Other Additives

The ink composition may also contain additives (components) other than the additives exemplified above. As such components, there are no particular limitations, however, for example, well-known slipping agents (surfactants), polymerization promoters, permeation promoters, wetting agents (moisturizing agents), and other additives may be used. Examples of the other additives include, for example, well-known fixing agents, fungicides, preservatives, antioxidants, ultraviolet absorbers, chelating agents, ph modifiers and thickeners.

Ultraviolet Curing Ink Jet Ink Composition Dissolved Oxygen Content

In the ink composition accommodated in the ink accommodation body, which is an embodiment of the present embodiment, it is preferable for the dissolved oxygen content to be 20 ppm or less. By performing treatments such as deaeration such that the dissolved oxygen content is 20 ppm or less, it is possible to obtain an ink composition having excellent discharge stability and curing properties. Accordingly, it is possible to favorably use the ink composition for an ink jet recording apparatus.

In addition, since air dissolves into the ink when the ink passes through the ink flow path during the use in an ink jet recording apparatus, there is a case in which the dissolved oxygen content rises. However, if the dissolved oxygen content of the ink composition within the ink accommodation body is 20 ppm or less, it is easy to obtain an ink composition having excellent discharge stability and curing properties when the ink is loaded from the ink accommodation body into the ink jet recording apparatus and recording is performed.

In addition, since the curing properties and the storage stability may be further improved, the dissolved oxygen content is preferably 1 to 20 ppm, more preferably 3 to 20 ppm and particularly preferably 5 to 15 ppm.

Here, the "dissolved oxygen content" in the present specification may be within the predetermined ranges described above, at least when loading the ink composition into the ink jet recording apparatus. More specifically, the period during which it is necessary for the dissolved oxygen content to be within the above predetermined ranges is from when the ink accommodation body is dispatched for delivery until just before the ink accommodation body or the ink composition within the ink accommodation body is mounted, filled or used in the recording apparatus. In addition, in the case of a recording apparatus provided with a deaeration mechanism, it is possible to reduce the dissolved oxygen content within the recording apparatus. However, even in such a case, there may be limits to the deaeration ability of the recording apparatus. Therefore, the dissolved oxygen content in the ink accommodation body may be within the above ranges. Meanwhile, in a case of a recording apparatus in which there is (approximately) no change in the dissolved oxygen content within the recording apparatus, even if the recording apparatus is not provided with a deaeration mechanism, the dissolved oxygen content of the ink in the ink accommodation body may at least be within the above ranges.

Furthermore, the dissolved oxygen content in the present specification may be measured using a well-known method. However, for convenience, the values obtained using the measurement method employed in the examples described below will be used.

Here, when treatment such as deaeration for reducing the dissolved oxygen content is not performed, the dissolved oxygen content of the ink composition is normally approximately 50 to 60 ppm. Therefore, treatment such as deaeration is necessary in order to set the dissolved oxygen content to 20 ppm or less. While not limited to the following, examples of the treatment include, for example, a deaeration mechanism and the bubbling of inert gases.

Configuration of Ink Accommodation Body

While not limited to the following, examples of the form of the ink accommodation body, which is an embodiment of the present embodiment, include, for example, a pack, a bottle, a tank, a jar and a can. Among these, an ink accommodation body having a container (a pack) using a flexible film as the container which is filled with the ink of the ink accommodation body (in the ink accommodation body, a member that substantially maintains the ink loaded thereto) is preferable in that, because it is easy to insert the container into a box-shaped ink accommodation body, the volume of the container changes easily in accordance with the amount of remaining ink, and it is possible to use the container by heat sealing the film and processing it into a bag-shape and from a viewpoint of reducing weight.

Furthermore, examples of as modes of usage of the ink accommodation body of the present embodiment include at least (A) a mode of a part separated from the recording apparatus such as an ink cartridge mounted in the recording apparatus that sequentially supplies ink to the recording apparatus, (B) a mode of a part separated from the recording apparatus which moves only the ink from the ink accommodation body to the recording apparatus when the ink is used, and (C) a mode of a tank or the like installed in the recording apparatus in advance in which the ink is accommodated.

The modes (A) and (B) could be said to be the ink accommodation body from when the ink accommodation body is dispatched for delivery until just before the ink is supplied (moved) to the recording apparatus. The mode (C) could be said to be the ink accommodation body from when the recording apparatus is dispatched for delivery until the ink is first used in the recording apparatus.

Furthermore, the modes (A) and (C) could be said to be the ink accommodation body which performs the printing of the recording apparatus in a state in which the ink is being supplied from the ink container to the recording apparatus via the connection portion of an ink tube or the like. In addition, the mode (B) could be said to be the ink accommodation body in which the printing is performed in the recording apparatus after the ink has been moved from the ink accommodation body to the recording apparatus. Furthermore, a tank installed in the recording apparatus is an example of the target to which the ink is moved in the mode (B).

While not limited to the following, examples of the configuration materials of the container to which ink is loaded include, for example, polyethylene terephthalate (PET), polypropylene, polyethylene, ethylene-vinyl acetate copolymer, ethylene vinyl alcohol copolymer (EVOH), polystyrene and films of these. The container may also be configured by mixing appropriate proportions of the above materials, or by overlapping a plurality of types of the above materials. When a film is used, the film may also be obtained by lamination.

In the ink accommodation body, there is a case in which stirring is performed in order to recover the accommodated ink composition from the precipitation that occurs during storage and transport. This is because, when a long period of time passes after the precipitation of the ink components, there is a case in which the caking of the precipitate occurs and recovery becomes difficult. In addition, it is preferable to recover the ink from precipitation by stirring the ink accommodation body when the ink is supplied to the recording apparatus from the ink accommodation body.

When a container (a pack) using a flexible film is used, it is particularly necessary to secure sufficient durability that cracking and ripping do not occur due to the stirring operation. Examples of preferable film materials having such durability include plastic films such as polyethylene terephthalate (PET), polypropylene, polyethylene, ethylene-vinyl acetate copolymers, ethylene vinyl alcohol copolymers and polystyrene, and ethylene-vinyl acetate copolymers.

Preferable examples of the film include stretchable plastic films such as high density, low density or linear low density polyethylene, polypropylene, ethylene-vinyl alcohol copolymers, and polystyrene. A plurality of layers of film may also be stuck together and used as a laminated film.

In addition, among the configuration materials of the container, the oxygen permeability of the members including the ink (hereinafter, simply referred to as "the oxygen permeability") is preferably 5.0 cc·20 µm/(m$^2$·day·atm) or less and more preferably 2.0 cc·20 µm/(m$^2$·day·atm) or less. When the oxygen permeability is within the above ranges, the dissolved oxygen content of the ink composition is less apt to change during storage. When the member is a film, when the oxygen permeability of the plastic film (the plastic film itself) is within the above ranges, it is possible to configure the film from only the plastic film, and the oxygen permeability may also be secured by using a film in which a gas barrier layer is laminated with the plastic film.

For the gas barrier layer, a metal layer such as an aluminum layer, an inorganic gas barrier layer such as an inorganic oxide layer such as a silicon oxide or aluminum oxide layer may be used. Further, a film may also be used in which, of the plastic films, an ethylene-vinyl alcohol copolymer, a polyvinyl alcohol or the like having a low oxygen permeability is used as the gas barrier layer and laminated using another plastic film. The total film thickness of the film is preferably 50 µm or more, more preferably 70 µm or more and even more preferably 70 to 200 µm. When the above film thickness is used, the dissolved oxygen content of the ink composition during storage is less apt to change, and strength and flexibility of the pack may be obtained. Among these, it is preferable to use a film formed from an ethylene-vinyl alcohol copolymer since the oxygen permeability is low and the strength (the durability) is excellent.

As described above, a case in which the oxygen permeability of the plastic film (the plastic film itself) is within the above oxygen permeability ranges is preferable, since the dissolved oxygen content of the ink is not apt to change during storage due to the film configured from the plastic film. In addition, the film formed of the plastic film is preferable, since it has excellent ink pack durability in comparison to the film provided with an inorganic gas barrier. Furthermore, a film may also be used which is further provided with an inorganic gas barrier layer in order to increase the light shielding properties or the like of the ink pack. While there are no limits to the plastic film as long as it satisfies the oxygen permeability conditions described above, among these, a film formed from an ethylene-vinyl alcohol copolymer is preferable due to having even more excellent oxygen permeability and durability and not being apt to corrosion through the components of the ink.

Furthermore, the oxygen permeability in the present specification is represented in units of cc·20 µm/(m$^2$·day·atm), where "atm" is the pressure under conditions of 23° C. and 65% humidity.

In addition, the oxygen permeability is calculated by measuring (at the time that the relative humidity reaches an equilibrium state) the permeation speed of oxygen permeating the film by using the method defined in ISO 14663-2:1999 (Annex C), that is, using a coulometer.

The capacity of the ink composition that the ink accommodation body is capable of accommodating is not particularly limited, however, it is preferably 100 mL to 2,000 mL, more preferably 100 mL to 1,000 mL and even more preferably 200 mL to 800 mL. When the capacity is within the above ranges, it is possible to obtain an ink having even more excellent curing properties, storage stability and discharge stability.

Furthermore, when the capacity is within the above ranges, favorable effects may be obtained, such as being able to use all of the ink composition during the period in which, after the ink accommodation body is first used, the dissolved oxygen content of the ink inside the ink accommodation body does not significantly change, or the dissolved oxygen content of the ink composition not being apt to change during storage. In addition, it is particularly preferable for the ink accommodation body to have the oxygen permeability of the member of the ink accommodation body described above, and for the capacity of the ink composition that may be accommodated to be within the above ranges. In addition, the term "capacity" in the present specification means the volume.

Here, description will be given of the ink cartridge, which is an example of the ink accommodation body of the present embodiment. FIG. 1 is a view showing an exploded perspective of an ink cartridge 40.

The ink cartridge 40 is formed from an ink pack 70 which is filled with ink, a cartridge case 72 formed from a main body case 76 that accommodates the ink pack therein and a lid portion 78. The ink pack is provided with an ink supply port 74, and the main body case is provided with a hook portion 84, a notch portion 80 and a restraint portion 82. The materials described above may be used for the material of the ink pack.

In this manner, according to the present embodiment, it is possible to provide an ink accommodation body which accommodates an ultraviolet curing ink jet ink composition which has excellent durability and precipitation resistance, and further, has excellent storage stability, curing properties and discharge stability of the accommodated ink composition.

Ink Jet Recording Method

An embodiment of the invention relates to an ink jet recording method using the ultraviolet curing ink jet ink composition of the above embodiment.

The ink jet recording method includes a discharge step of discharging the ink composition onto the recording medium, and a curing step of curing the ink composition by irradiating the ink composition discharged in the discharge step with ultraviolet rays. In this manner, a coating film (a cured film) is formed using the ink composition which is cured on the recording medium.

Ink Jet Recording Apparatus

An embodiment of the invention relates to an ink jet recording apparatus, that is, an ink jet printer. The recording apparatus may use the ink jet recording method of the embodiment described above.

The recording apparatus (the printer) for implementing the recording method will be described in detail.

The printer of the present embodiment may record (form an image) inks of various colors to the recording medium, and examples of the image formation include, for example, forming an image using ink of the four colors of CMYK (cyan, magenta, yellow and black), or forming an undercoat image which imparts excellent concealment properties to the recording medium using a white ink.

Examples of types of the printer of the present embodiment include line printers and serial printers, either of which may be used. These printers have different systems. The line printer, which is a line system ink jet recording apparatus, discharges the ink onto the recording medium while the positions of a head, which has a nozzle row of a length (approximately) equivalent to the width of the recording medium, and the recording medium move relative to each other in the scan direction perpendicular to the width direction. Further, the head is fixed such that it does not (substantially) move and the recording is performed in one pass (a single pass).

Meanwhile, the serial printer, which is a serial system ink jet recording apparatus, normally performs recording using two passes or more (multipass) while the head moves reciprocally (shuttle movement) in a direction perpendicular to the transport direction of the recording medium. Furthermore, the passes described above may also be referred to as the "main scanning" described below.

Figure 2:
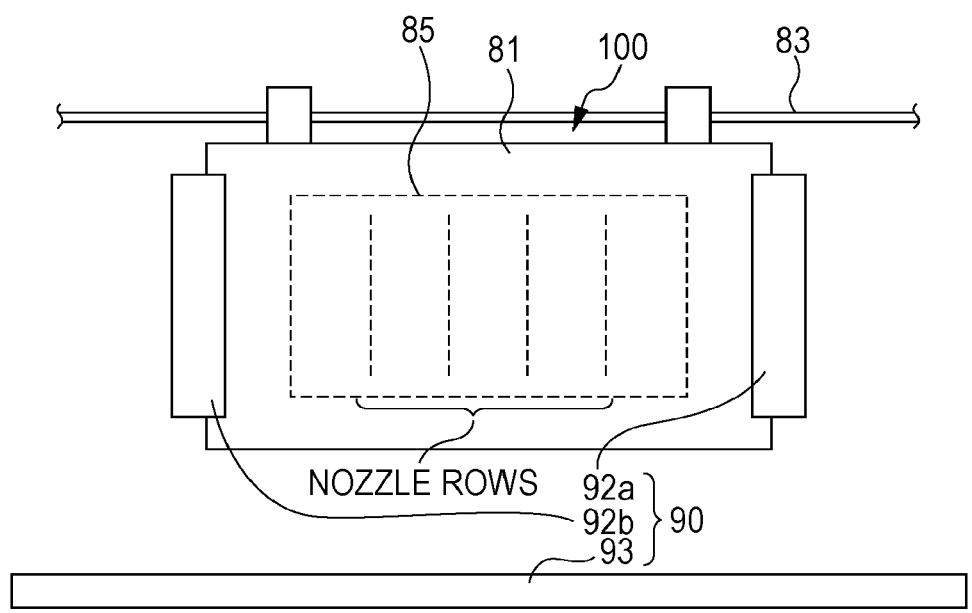
FIG. 2 is a schematic diagram showing an example of the periphery of the head of the ink jet recording apparatus of the invention.
Figure 2:
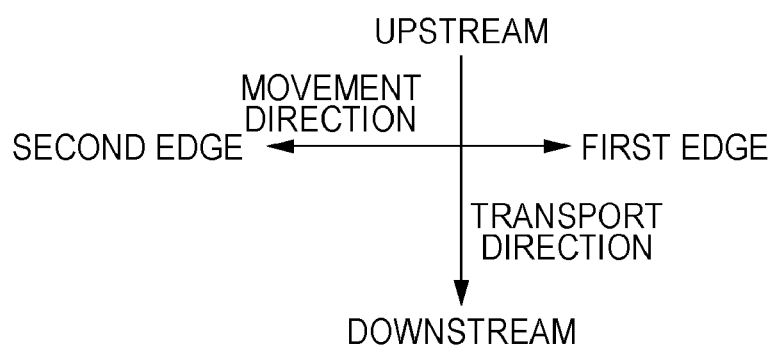

The printer of the present embodiment will be described below in detail with reference to FIG. 2. Furthermore, the scope of the invention is not limited to the following examples in any manner. In addition, in each figure used in the following description, the scale of each member is appropriately changed to make each member a visually recognizable size. FIG. 2 is a view schematically showing the periphery of the head of the serial printer which is an example of the recording apparatus of the present embodiment.

The carriage unit 100 is a movement mechanism which moves, that is, scans the head 85 in a direction (hereinafter, referred to as the "movement direction" or the "main scanning direction") which is perpendicular to the transport direction (the sub-scanning direction) while discharging the ink with respect to the recording medium which is stationary on the printing region. The carriage unit 100 is provided with a carriage 81 and a carriage motor (not shown). In addition, the carriage 81 maintains an ink cartridge (not shown), which accommodates the ultraviolet curing ink, in a removable manner. Furthermore, the carriage 81 is moved reciprocally along a guide shaft 83 by the carriage motor in a state of being supported by the guide shaft 83 which is perpendicular to the transport direction described below.

The head 85 is for discharging the ultraviolet curing ink to the recording medium, and includes a plurality of nozzles. Since the head 85 is provided on the carriage 81, when the carriage 81 moves in the movement direction, the head 85 also moves in the movement direction. Furthermore, a row of dots is formed on the recording medium in the movement direction by the head 85 intermittently discharging the ultraviolet curing ink as it moves in the movement direction.

Furthermore, with respect to the movement of the head 85, the discharging of the ultraviolet curing ink is performed as the head 85 moves from a first edge side to a second edge side of FIG. 2. However, the discharging of the ultraviolet curing ink is not performed as the head 85 moves from the second edge side to the first edge side.

The irradiation unit 90 is for curing the ultraviolet curing ink by irradiating the ultraviolet curing ink adhered (landed) on the recording medium with ultraviolet rays. The dots formed on the recording medium are cured to form a hardened material by being irradiated by the ultraviolet rays from the irradiation unit 90. In the irradiation unit 90, a first irradiation unit 92a, 92b, and a second irradiation unit 93 are provided on the downstream side in the transport direction of the head 85.

The first irradiation unit 92a, 92b radiates the ultraviolet rays for curing the dots formed on the recording medium, and is positioned in front of the second irradiation unit 93 where curing is similarly performed, that is, on the upstream side in the transport direction.

More specifically, the first irradiation unit 92a, 92b radiates the ultraviolet rays for temporary curing the dots formed on the recording medium, and conversely, the second irradiation unit 93 radiates the ultraviolet rays for performing the main curing on the dots that underwent temporary curing.

In the present specification, the term "temporary curing" means the temporary tacking (the pinning) of the ink, and more specifically refers to curing performed before the main curing in order to prevent bleeding between the dots and to control the dot diameter. Generally, the degree of polymerization of the polymerizable compound in the temporary curing is lower than the degree of polymerization of the polymerizable compound through the main curing performed after the temporary curing. In addition, the term "main curing" refers to curing the dots formed on the recording medium until they reach the curing state necessary to use the recorded object.

The second irradiation unit 93 radiates the ultraviolet rays for (substantially) completely curing, that is, main curing, the dots formed on the recording medium. The second irradiation unit 93 is provided further on the downstream side in the transport direction than the head 85 and irradiates the dots formed by the head 85 with ultraviolet rays.

Furthermore, the ink may be subjected to the main curing by the irradiation of the ultraviolet rays from at least one of the first irradiation unit 92a, 92b and the second irradiation unit 93. Accordingly, the curing step may be completed by radiating ultraviolet rays from the second irradiation unit 93 without radiating ultraviolet rays from the first irradiation unit 92a, 92b. In addition, irrespective of whether or not the ultraviolet rays are radiated from the second irradiation unit 93, the main curing may also be performed by at least one of the first irradiation units 92a and 92b radiating the ultraviolet rays. When the main curing is performed by at least one of the first irradiation units 92a and 92b, the second irradiation unit 93 may be absent. In this manner, the curing step may perform only the main curing without performing the temporary curing.

In this manner, in the present embodiment, recording may be performed by alternately repeating a main scan in which the ink is discharged from the head 85 and cured while the head 85 is moved in the movement direction (the main scanning direction) to form at least a portion of the image, and a sub-scan in which the relative position of the head 85 and the recording medium is changed in the transport direction (the sub-scanning direction) which intersects the main scanning direction. That is, the main scan implements the discharge step and the curing step and the sub-scan transports the recording medium in the transport direction. Furthermore, it is possible to complete the image on the recording medium by repeating the main scan and the sub scan.

In addition, instead of as in the sub-scan described above, the sub-scan may be performed by the carriage unit 100 also moving in the sub-scanning direction without the recording medium being transported.

In addition, it is preferable for the recording method of the present embodiment to be performed using so-called overlap printing. Here, description will be given of the overlap printing in the present embodiment.

The overlap printing in the present embodiment includes the first mode and the second mode described below. Here, the term "raster line" refers to a row (a dot row) in which pixels are lined up in one row in the main scanning direction.

In the first mode, in one main scan, there are pixels which form dots with respect to one raster line and pixels which do not form dots, and by performing the main scan a plurality of times, raster lines which form one raster line are present. Furthermore, according to the first mode, the one raster line may be formed through a plurality of scans. This mode may be called an "overlapping raster line". That is, in the overlapping raster line, there are pixels which are dot-formed in one main scan, and pixels which are not dot-formed in that one main scan and are dot-formed in another main scan.

In the second mode, in addition to the first mode, between in the sub-scanning direction of the raster lines, in which the dot formation is performed in a first main scan, there are raster lines present, in which the dot formation is performed in another main scan. That is, between the raster lines which are dot formed in one main scan, there are also raster lines which are not dot-formed in that one main scan and are dot-formed in another main scan.

In the overlapping raster line, there are at least two passes in which dots are formed, and there may be three or more. In addition, among the entire number of pixels in one raster line, the proportion of pixels present which are not adjacent to the other pixels that are dot formed in one pass is preferably 50% or more and more preferably 70% or more. In addition, of all of the raster lines which are dot-formed, the proportion of overlapping raster lines present is preferably 50% or more and more preferably 70% or more.

Among the overlapping raster lines, when the overlap printing provided with the second mode is performed, it is possible to distribute the dots formed in one main scan in the main scanning direction and in the sub-scanning direction.

In this manner, according to the present embodiment, it is possible to provide an ink jet recording apparatus which has excellent control of curing properties and cure wrinkling, and excellent filling properties of solid pattern images and line width (in the sub-scanning direction and the main scanning direction).

Head

The ink jet head provided in the ink jet recording apparatus may be a head which uses an epoxy adhesive on at least part of a portion of the head, such as the inner portion or the surface, which makes contact with the ink composition. By using a head using an epoxy adhesive, in particular, it is possible to maintain a strong adherence between the parts of the head, even when there is a temperature change in the head. Here, the term "make contact with the ink composition" includes whether direct contact is made with the ink composition or whether indirect contact is made through the permeation of the components of the ink composition.

At this time, since it is possible to prevent the epoxy adhesive from swelling, the ink composition of the present embodiment has excellent material resistance. In this manner, it is possible to favorably discharge the light curing ink composition of the present embodiment from the head using the epoxy adhesive.

While not limited to the following, a well-known adhesive which cures a main agent, which contains a compound having an epoxy group, using a curing agent is an example of the epoxy-based adhesive. While not limited to the following, examples of the compound having an epoxy group contained in the main agent include, for example, bisphenol-type epoxies such as an A-type bisphenol and an F-type bisphenol, novolac-type epoxies such as phenol novolak-type and cresol novolak-type, epoxy polyol-type epoxy, urethane-modified epoxy, chelate-modified epoxy and rubber-modified epoxy. While not limited to the following, examples of the curing agent include, for example, amines such as amine and polyamine, amides such as amide and polyamide, imidazoles and polymercaptans. Among these, it is preferable to use a combination in which a bisphenol-type epoxy as the main agent and an amines is used as the curing agent, since excellent adhesiveness may be obtained. It is preferable for the mixture ratio of the main agent and the curing agent (main agent: curing agent) to be 10:1 to 1:10 in terms of mass, since excellent curing properties of the adhesive may be obtained.

Recording Medium

The recorded object is obtained by discharging the ink composition onto the recording medium using the ink jet recording method of the present embodiment. An absorbent or non-absorbent recording medium is an example of the recording medium. The ink jet recording method of the present embodiment may be applied widely to recording media having various degrees of absorption ability, from a non-absorbent recording medium which is difficult for the ink composition to permeate, to an absorbent recording medium which is easy for the ink composition to permeate. However, when the ink composition is applied to a non-absorbent recording medium, there is a case in which it is necessary to provide a drying step after curing is performed by the irradiation of ultraviolet rays.

While not particularly limited, examples of the absorbent recording media include, for example, normal paper such as electrophotography paper and ink jet paper (ink jet exclusive paper provided with an ink absorption layer configured from silica particles or alumina particles, or an ink absorption layer configured from a hydrophilic polymer such as polyvinyl alcohol (PVA) or polyvinylpyrrolidone (PVP)) which have high ink permeability, and art paper, coated paper, cast paper or the like which have comparatively low ink permeability and are used in general offset printing.

While not particularly limited, examples of non-absorbent recording media include, for example, films and plates of plastics such as polyvinyl chloride, polyethylene, polypropylene and polyethylene terephthalate (PET); plates of metals such as iron, silver, copper and aluminum; or metal plates produced by vapor deposition of each type of these metals, plastic films, and plates of alloys such as stainless steel, brass or the like.

Discharge Step

The discharge step in the present embodiment discharges the ultraviolet curing ink from the head toward the recording medium. The temperature of the discharged ultraviolet curing ink is 20° C. to 40° C.

The temperature of 20° C. to 40° C. described above is a comparatively low temperature whether the temperature of the ink is not to be increased above room temperature by heating, or even when the temperature is to be increased by heating. In this manner, by the temperature of the discharged ink (hereinafter, also referred to as the "discharge temperature") being within the above range, it is easy to stabilize the temperature of the ink since it is either not necessary to provide an ink heating mechanism to heat the ink, or even if an ink heating mechanism is provided, a comparatively low temperature heating is sufficient. Therefore, the heating mechanism may be simplified, which is beneficial from a viewpoint of usage cost reductions of the ink jet recording apparatus and the energy usage reductions when using the recording apparatus.

Furthermore, it is preferable for the temperature to be within the above range since an ink having the viscosity described above may be discharged from the head in a stable manner. In addition, the durability of the head is excellent since it is possible to prevent degradation of the members of the head. Since it is possible to obtain more excellent head durability and discharge stability, the temperature of the discharged ink is preferably 20° C. to 30° C. when the ink is 8 mPa·s or more and less than 15 mPa·s at 20° C., and preferably 30° C. to 40° C. when the ink is 15 mPa·s or more and 22 mPa·s or less at 20° C.

Here, "the temperature of the discharged ultraviolet curing ink" is set to the temperature of the member (the nozzle plate) on which the nozzles of the head are formed. In addition, the printing is performed by continually discharging the ink from the head for a predetermined time (for example, 60 minutes). During this period, the temperature of the nozzles is measured at a predetermined time interval (for example, every five minutes), and the average value of each of the measured temperatures represents "the temperature of the discharged ultraviolet curing ink".

It is preferable for the discharge temperature to be 20° C. to 30° C. since an ink heating mechanism becomes unnecessary and the recording apparatus may be further simplified. Meanwhile, it is preferable for the discharge temperature to be 30° C. to 40° C. since the ink viscosity may be kept the lowest with respect to the discharge temperature and a more excellent discharge stability may be obtained. From a viewpoint of improving the discharge stability, the ink viscosity with respect to the discharge temperature is preferably 22 mPa·s or less, more preferably 15 mPa·s or less and yet more preferably 13 mPa·s or less. The lower limit of the ink viscosity during discharging is not limited, however, may be 3 mPa·s or higher.

Curing Step

Next, in the curing step, the ink composition discharged onto the recording medium is cured by the irradiation of ultraviolet rays (light). In other words, an ink coating film formed on the recording medium becomes a cured film through the irradiation of ultraviolet rays. This is due to the fact that the photoinitiator which may be contained in the ink composition decomposes through the irradiation of ultraviolet rays, emits initiating species such as radicals, acids and bases, and a polymerization reaction of the photopolymerizable compound is promoted by the function of the initiating species. That is, this is due to the fact that a photopolymerization reaction of polymerizable compound is initiated through the irradiation of ultraviolet rays. At this time, when a photoinitiator and a sensitizing colorant are both present in the ink composition, the sensitizing colorant in the system absorbs active radiation and enters an excited state, the decomposition of the photoinitiator is promoted by the contact with the photoinitiator, and it is possible to achieve a curing reaction of higher sensitivity.

As the ultraviolet ray source, a mercury lamp, a gas or solid-state laser, or the like is mainly used, and, as the light source used for curing the ink composition for the ultraviolet curing ink jet recording, a mercury lamp and a metal halide lamp are widely known. However, currently, mercury free is strongly desirable from the viewpoint of protecting the environment and replacement with GaN-based semiconductor ultraviolet light-emitting devices is extremely effective, industrially and environmentally. Furthermore, an ultraviolet light emitting diode (UV-LED) and an ultraviolet laser diode (UV-LD) are compact, have a long life, are highly efficient, are low cost and are anticipated as light sources for ultraviolet curing ink jets. Among these, the UV-LED is preferable.

Here, it is preferable to use an ink composition that is curable through the irradiation of ultraviolet rays of a single wavelength in which the peak light emission wavelength is preferably within the range of 365 nm to 405 nm and is more preferably within the range of 380 nm to 400 nm. The intensity of the peak light emission wavelength is preferably 800 mW/cm$^2$ or more, more preferably 1000 mW/cm$^2$ or more, and the upper limit is not limited, however, the upper limit may be 3000 mW/cm$^2$ or less. In addition, the irradiation energy is preferably 300 mJ/cm$^2$ or less and more preferably 100 to 250 mJ/cm$^2$.

In the case described above, it is possible to obtain a low energy, high speed cure due to the composition of the ink composition. The irradiation energy is calculated by multiplying the irradiation intensity with the irradiation time. It is possible to shorten the irradiation time according to the composition of the ink composition, and in such a case, the printing speed increases. Meanwhile, the irradiation intensity may also be reduced according to the composition of the ink composition of the present embodiment, and in such a case, miniaturization and cost reduction of the apparatus are achieved. It is preferable to use the UV-LED for the ultraviolet irradiation in this case. Such an ink composition may be obtained by containing a photoinitiator which decomposes through the irradiation of ultraviolet rays of a wavelength in the above ranges, and a polymerizable compound which initiates polymerization through the irradiation of ultraviolet rays of a wavelength in the above ranges. Furthermore, there may be one of the peak light emission wavelengths within the ranges of wavelengths described above, and there may also be a plurality thereof. Even if there are a plurality of peak light emission wavelengths, the total irradiation energy of the ultraviolet rays having the peak light emission wavelengths is considered to be the irradiation energy described above.

EXAMPLES

Hereinafter, specific description will be further given of an embodiment of the invention using examples; however, the present embodiment is not limited to these examples.

1. Ink Composition Example

Materials Used

The materials used in the examples and comparative examples described below are as follows.

Inorganic Metal-Based Fine Particles
  Titanium dioxide (average particle diameter 200 nm, manufactured by ISHIHARA SANGYO KAISHA, LTD.)
  Titanium dioxide (average particle diameter 300 nm, manufactured by ISHIHARA SANGYO KAISHA, LTD.) Pentaerythritol Skeleton Trifunctional or Tetrafunctional (Meth)acrylate
  Pentaerythritol triacrylate (SR444 manufactured by Sartomer USA, LLC, abbreviated to SR444 in the table)
  Pentaerythritol tetraacrylate (NK ester A-TMMT manufactured by Shin-Nakamura Chemical Co., Ltd., abbreviated to A-TMMT in the table)
Other Polymerizable Compounds
  2-(2-vinyloxyethoxy)ethyl acrylate (manufactured by NIPPON SHOKUBAI CO., LTD., abbreviated to VEEA in the table)
  Phenoxyethyl acrylate (V#192, manufactured by OSAKA ORGANIC CHEMICAL INDUSTRY LTD., abbreviated to PEA in the table)
  Dipropylene glycol diacrylate (SR508, manufactured by Sartomer USA, LLC, abbreviated to DPGDA in the table)
  Dipentaerythritol hexaacrylate (SR399, manufactured by Sartomer USA, LLC, abbreviated to SR399 in the table)
  Tetrahydrofurfuryl acrylate (V#150, manufactured by OSAKA ORGANIC CHEMICAL INDUSTRY LTD., abbreviated to THFA in the table)
  Benzyl acrylate (V#160, manufactured by OSAKA ORGANIC CHEMICAL INDUSTRY LTD., abbreviated to BZA in the table)
  Urethane oligomer (CN3550, manufactured by Sartomer USA, LLC, abbreviated to CN3550 in the table)
  Hyperbranched polymer (V#1000, manufactured by OSAKA ORGANIC CHEMICAL INDUSTRY LTD., abbreviated to V#1000 in the table)
Photoinitiators
  IRGACURE 819 (manufactured by and trademark of BASF Corporation, solid content 100%, abbreviated to "819" in the table)
  DAROCURE TPO (manufactured by and trademark of BASF Corporation, solid content 100%, abbreviated to "TPO" in the table)
Other Components
  C.I. pigment blue 15:3 (Cyanine Blue KRO, manufactured by Sanyo Color Works, LTD., abbreviated to "cyan" in the table)
  Solsperse 36000 (manufactured by and trademark of Noveon, abbreviated to "Sol36000" in the table)
  Polymerization inhibitor (p-methoxyphenol, manufactured by KANTO KAGAKU)
  Slipping agent (BYK-UV3500, manufactured by and trademark of BYK-Chemie Japan Co., Ltd.)
Ink Composition
Preparation of Pigment Dispersion The pigment dispersion was prepared before the preparation of the ink composition. For each of the ink compositions in the table, as the pigment, titanium dioxide or C.I. pigment blue 15:3, as the dispersant or dispersion medium, phenoxyethyl acrylate or benzyl acrylate of the polymerizable compounds were respectively mixed and stirred for one hour using a stirrer. After stirring, the mixed liquor was dispersed using a bead mill and a pigment dispersion was obtained. Furthermore, the dispersion conditions were set such that zirconia beads with a diameter of 0.65 mm were filled to a filling factor of 70%, the circumferential speed was set to 9 m/s, and the dispersion time was set to 2 to 4 hours.

Preparation of Ink Composition

The pigment dispersion and the remaining components of the table were added so as to obtain the composition (in units of mass %) denoted in the table. The ultraviolet curing ink jet ink composition was prepared by stirring this composition using fast water cooling mixer. Subsequently, the ink composition was prepared by subjecting the ink to deaeration using a vacuum pump to set the dissolved oxygen content of each of the inks to 1 ppm. The measurement of the dissolved oxygen content was performed using the equipment used for measuring the dissolved oxygen content of the ink pack example described below.

The viscosity of the prepared ink composition at 20° C. was measured using a DVM-E type rotational viscometer (manufactured by TOKYO KEIKI INC.).

A DVM-E type cone having a cone angle of 1°34' and a cone diameter of 2.4 cm was used for the rotor. The rotational speed was set to 10 rpm.

The evaluation criteria (the viscosity rank) are as follows. The compositions and the evaluation results of the viscosities thereof are denoted in Table 1 below.

A: Less than 8 mPa·s.
B: 8 mPa·s or more and less than 15 mPa·s.
C: 15 mPa·s or more and 20 mPa·s or less.
D: More than 20 mPa·s.

TABLE 1

| | | Ink Composition (1) | | | | | | | | |
|---|---|---|---|---|---|---|---|---|---|---|
| | | 1 | 2 | 3 | 4 | 5 | 6 | 7 | 8 | 9 |
| Polymerizable compound | VEEA | 30.0 | 55.5 | 33.3 | 40.0 | 30.0 | 30.0 | 30.0 | | 30.0 |
| | THFA | | | 20.0 | | | | | 15.0 | |
| | SR444 | 5.0 | 5.0 | 7.0 | 15.0 | | 5.0 | 5.0 | 5.0 | 5.0 |
| | A-TMMT | | | | | 5.0 | | | | |
| | SR399 | | | | | | | | | |
| | DPGDA | 12.3 | 2.0 | 2.0 | 7.3 | 12.3 | 12.3 | 17.3 | 17.3 | 12.3 |
| | PEA | 25.0 | 10.0 | 10.0 | 10.0 | 25.0 | 25.0 | 30.0 | 35.0 | |
| | BZA | | | | | | | | | 25.0 |
| | CN3550 | | | | | | | | | |
| | V#1000 | | | | | | | | | |
| Photoinitiator | 819 | 4.0 | 4.0 | 4.0 | 4.0 | 4.0 | 4.0 | 4.0 | 4.0 | 4.0 |
| | TPO | 4.5 | 4.5 | 4.5 | 4.5 | 4.5 | 4.5 | 4.5 | 4.5 | 4.5 |
| Slipping agent | 3500 | 0.4 | 0.4 | 0.4 | 0.4 | 0.4 | 0.4 | 0.4 | 0.4 | 0.4 |
| Polymerization inhibitor | p-MEPH | 0.3 | 0.3 | 0.3 | 0.3 | 0.3 | 0.3 | 0.3 | 0.3 | 0.3 |
| Pigment | $TiO_2$ (200 nm) | 18.0 | 18.0 | 18.0 | 18.0 | 18.0 | | 8.0 | 18.0 | 18.0 |
| | $TiO_2$ (300 nm) | | | | | | 18.0 | | | |
| | BLUE GLVO | | | | | | | | | |
| Dispersant | 36000 | 0.5 | 0.5 | 0.5 | 0.5 | 0.5 | 0.5 | 0.5 | 0.5 | 0.5 |
| Total amount | | 100.0 | 100.0 | 100.0 | 100.0 | 100.0 | 100.0 | 100.0 | 100.0 | 100.0 |
| 20° C. viscosity rank | | C | B | B | C | C | C | C | C | C |

| | | Ink Composition (2) | | | | | | | | |
|---|---|---|---|---|---|---|---|---|---|---|
| | | 10 | 11 | 12 | 13 | 14 | 15 | 16 | 17 | 18 |
| Polymerizable compound | VEEA | 30.0 | 25.0 | 25.0 | 7.0 | 30.0 | 27.0 | 13.3 | 13.3 | 25.3 |
| | THFA | | | | | | | 50.0 | 50.0 | 55.0 |
| | SR444 | | | | | | 20.0 | 1.0 | | 1.0 |
| | A-TMMT | | | | | | | | | |
| | SR399 | | | | | 5.0 | | | | |
| | DPGDA | 7.3 | 22.3 | 22.0 | 45.0 | 12.3 | 5.3 | 2.0 | 2.0 | 2.0 |
| | PEA | 30.0 | 15.0 | 20.3 | 20.3 | 25.0 | 20.0 | 6.0 | 6.0 | 6.0 |
| | BZA | | | | | | | | | |
| | CN3550 | | | | 5.0 | | | | | |
| | V#1000 | 5.0 | 10.0 | | | | | | 1.0 | |
| Photoinitiator | 819 | 4.0 | 4.0 | 4.0 | 4.0 | 4.0 | 4.0 | 4.0 | 4.0 | 4.0 |
| | TPO | 4.5 | 4.5 | 4.5 | 4.5 | 4.5 | 4.5 | 4.5 | 4.5 | 4.5 |
| Slipping agent | 3500 | 0.4 | 0.4 | 0.4 | 0.4 | 0.4 | 0.4 | 0.4 | 0.4 | 0.4 |
| Polymerization inhibitor | p-MEPH | 0.3 | 0.3 | 0.3 | 0.3 | 0.3 | 0.3 | 0.3 | 0.3 | 0.3 |
| Pigment | $TiO_2$ (200 nm) | 18.0 | 18.0 | 18.0 | 18.0 | 18.0 | 18.0 | 18.0 | 18.0 | |
| | $TiO_2$ (300 nm) | | | | | | | | | |
| | BLUE GLVO | | | | | | | | | 1.0 |
| Dispersant | 36000 | 0.5 | 0.5 | 0.5 | 0.5 | 0.5 | 0.5 | 0.5 | 0.5 | 0.5 |
| Total amount | | 100.0 | 100.0 | 100.0 | 100.0 | 100.0 | 100.0 | 100.0 | 100.0 | 100.0 |
| 20° C. viscosity rank | | C | C | C | C | C | D | A | A | A |

The ultraviolet curing ink jet ink compositions prepared in each of the composition examples were evaluated using a method of the following evaluation items.

1. Storage Stability 100 g of the ink composition was accommodated in a glass container, and the container was sealed. The container was stored in an oven at 60° C. for 20 days. Furthermore, the viscosity increase factor of the viscosity before and after storage was obtained. The measurement of the viscosity was measured at 20° C. using the same method as the measurement of the viscosity described above.

The evaluation criteria are as follows. The evaluation results are shown in Table 2.
A: 3% or less.
B: More than 3%.

2. Curing Properties

An ink coating film of a thickness of 10 μm was prepared by coating a PET film (PET50A PL Shin (trademark)) with each of the ink compositions using a bar type coater. Subsequently, the coating film was cured by the irradiation of ultraviolet rays having a irradiation intensity of 1100 mW/cm$^2$ and a wavelength of 395 nm. The cured coating film (the cured film) was rubbed 10 times with 100 g of applied weight using a cotton rod, and the point in time at which the coating film is no longer scratched is set as the cured state. The curing energy (the irradiation energy) used to achieve this state was obtained.

Furthermore, the irradiation intensity [mW/cm$^2$] with respect to the irradiation-target surface that was irradiated from the light source was measured, and the irradiation energy [mJ/cm$^2$] was obtained from the product of the irradiation intensity and the sustained irradiation time [s]. The measurement of the irradiation intensity was performed using the UM-10 Ultraviolet ray intensity meter and the Receptor Head UM-400 (both manufactured by Konica Minolta Sensing, Inc.).

The evaluation criteria are as follows. The evaluation results are shown in Table 2.
A: 200 mJ/cm$^2$ or less.
B: More than 200 mJ/cm$^2$ and 300 mJ/cm$^2$ or less.
C: More than 300 mJ/cm$^2$.
3. Precipitation Resistance Each of the ink compositions was placed into a 50 mL sample bottle, sealed and stored in a static state. Before storage and 24 hours later, after storage, 1 mL of ink was sampled from the upper portions of the respective ink compositions in the bottles. The samples from after storage were samples of the supernatant liquid of the inks. The sampled ink was diluted by a factor of 5000 with ethyldiglycol acetate. Next, the absorbance (the abs value) of the diluted ink at a wavelength of 500 nm was measured using a spectrophotometer ("Spectrophotometer U-3300", manufactured by Hitachi Co., Ltd.). The proportion (%) of the absorbance of the ink after storage with respect to the absorbance of the ink prior to storage was calculated.
A: 98% or more.
B: 95% or more.
C: 93% or more.
D: 90% or more.
4. Shielding Properties The film provided with the ink coating film obtained in the curing properties evaluation was set in a declination colorimeter (manufactured by JASCO Corporation, model "ARM-500V"), and the transmittance Tn (%) of each wavelength of every 1 nm with respect to the visible light range (380 nm to 700 nm) was measured. The shielding properties were evaluated by calculating the average value of the transmittance Tn of every one of each wavelength in the visible light range (380 nm to 700 nm) from the measurement results.
A: The average value of transmittance Tn is 5% or less.
B: The integral value of transmittance Tn is more than 5%.

or tetrafunctional (meth)acrylate having a pentaerythritol skeleton, had poor storage stability.

In addition, the ink compositions 16 and 17, which had an ink viscosity rank of A, but did not contain a trifunctional or tetrafunctional (meth)acrylate having a pentaerythritol skeleton, had poor precipitation resistance. In addition, the ink composition 18 which did not contain inorganic metal-based fine particles had an ink viscosity rank of A. Even so, although the precipitation resistance was not poor, the shielding properties were poor.

2. Ink Jet Recording Method Example

The serial printer shown in FIG. 2 was used. Specifically, the ink jet printer PX-G5000 (manufactured by Seiko Epson Corporation) was used with a light source (UV-LED) described below attached further on the downstream side in the sub-scanning direction than the carriage and the platen. In addition, a heater capable of heating the ink was attached to the head, and it was made possible to adjust the temperature of the ink during discharging. The head was filled with one of each of the ink compositions prepared in the ink composition examples described above. Printing was performed by performing the main scanning while discharging the ink from the head onto a white PET film (LUMIRROR 125E20, manufactured by Toray Industries, Inc.) which was the recording medium. The nozzle row used for the printing had a nozzle density of 360 dpi in the sub-scanning direction.

When performing the main scanning, for each pass (one main scan), the ultraviolet curing ink, which was landed and adhered onto the recording medium through the main scan, was subjected to temporary curing (the dots were irradiated) using an LED having a peak wavelength of 395 nm installed adjacent to the carriage. At this time, Firefly (peak irradiation intensity of 1000 mW/cm$^2$) was used as the LED

TABLE 2

| | Ink composition | | | | | | | | | | | | | | | | | |
|---|---|---|---|---|---|---|---|---|---|---|---|---|---|---|---|---|---|---|
| | (1) | | | | | | | | | (2) | | | | | | | | |
| | 1 | 2 | 3 | 4 | 5 | 6 | 7 | 8 | 9 | 10 | 11 | 12 | 13 | 14 | 15 | 16 | 17 | 18 |
| Storage stability | A | B | A | A | A | A | A | A | A | C | C | C | A | C | C | A | A | A |
| Curing properties | A | A | B | A | B | A | A | C | A | B | B | B | C | A | A | B | B | B |
| Precipitation resistance | B | C | C | B | B | B | B | B | B | B | B | B | B | B | A | D | D | A |
| Shielding properties | A | A | A | A | A | A | A | A | A | A | A | A | A | A | A | A | A | B |

According to the above results, it was understood that an ultraviolet curing ink jet ink composition (denoted as ink composition (1) in the table) which contains a trifunctional or tetrafunctional (meth)acrylate having a pentaerythritol skeleton and, inorganic metal-based fine particles as the color material, and has a viscosity of 8 to 22 mPa·s at 20° C., in comparison with an ultraviolet curing ink jet ink composition (denoted as ink composition (2) in the table) where this is not the case, has excellent curing properties, storage stability, precipitation resistance and shielding properties.

When considering the specifics, the ink compositions 10 to 14, which had an ink viscosity rank of C, but did not contain a trifunctional or tetrafunctional (meth)acrylate having a pentaerythritol skeleton, had poor storage stability or curing properties. In addition, the ink composition 15, which had an ink viscosity rank of D, but contained a trifunctional installed adjacent to the carriage. In addition, the irradiation energy was 50 mJ/cm$^2$ with respect to the irradiation of one pass.

Next, after performing the sub-scanning in which the recording medium is transported in the sub-scanning direction which intersects the main scanning direction, the next main scan is performed. These main scans and sub-scans were repeated.

After completing the printing (after completing the final main scan), the ultraviolet curing ink adhered to the recording medium, which was transported further downstream in the sub-scanning direction than the platen, was further irradiated using a light source (a light source of the same type as the one installed on the carriage) of a width equivalent to that of the recording medium provided separately from the carriage. Therefore, uncured ink is completely cured. The irradiation energy of the curing was 400 mJ/cm$^2$.

As a supplement to the recording conditions (the printing conditions), the number of passes (the number of main scanning) was set to "2 passes (main scanning direction)×2 passes (sub-scanning direction)=4 passes". Specifically, overlap printing was performed in which dots were formed one pixel at a time for one raster line in one pass, and between two raster lines in which the dots were formed in one main scan, one raster line was present in which the dots were formed in another main scan. The interval between the nozzle face and the recording surface of the recording medium was set to 1 mm.

In addition, the recording resolution (sub-scanning direction×main scanning direction) was set to 720×720 dpi.

Furthermore, the temperature of the ink during discharging is as shown in Table 3 below. The temperature is the value which was obtained by measuring the temperature of the nozzle plate by providing a thermocouple on the nozzle plate. That is, the temperature of the ink discharged from the nozzle of the head corresponds to the temperate of the nozzle plate. In addition, of the temperatures shown in the table below, in examples where the ink temperature during discharging was 30° C. or higher, the ink during discharging was heated to the temperature using a heat adjustment mechanism (heater) installed in the head. In addition, in the examples where the ink temperature during discharging was lower than 30° C., the printing was performed at such a room temperature that the temperature was achieved at room temperature without using a heat adjustment mechanism. In each of the examples, of the head drive waveform voltage was adjusted such that the discharge amount was the same amount between each of the examples and each of the comparative examples.

The recording method described above was performed using the ink compositions prepared in the ink composition examples described above, and evaluation of each of the following evaluation items was performed.

1. Discharge Stability

Ink was discharged from 360 nozzles continually for five minutes.

The evaluation criteria are as follows. The evaluation results are shown in Table 3.
Excellent: There are less than 10 non-discharging nozzles during the continual discharging.
Poor: There are 10 or more non-discharging nozzles during the printing discharging.

2. Head Durability

The head durability was evaluated by measuring and calculating the swelling ratio of an adhesive the same as that used in the head. Approximately 0.2 g of an epoxy adhesive (an equal mixture of EPIKOTE 828, which is an epoxy resin manufactured by Shell, and VERSAMID 125, which is a curing agent manufactured by COGNIS) was cured to make a fragment of adhesive, and the weight was measured. Subsequently, the fragment of adhesive was immersed in the ink compositions of each of the examples and each of the comparative examples, which were inserted into screw-top bottles, covers the ink composition, and this was left in a 60° C. environment for seven days. After being left, the fragment of adhesive was removed from the screw-top bottle and measured the weight after the ink composition was washed off thoroughly. Furthermore, the swelling ratio was calculated using the formula below.

Weight change percentage(%)={(weight after insertion−weight before insertion)/weight before insertion}×100.

The evaluation criteria are as follows. The evaluation results are shown in Table 3.
A: 40% or less.
B: More than 40% and 60% or less.
C: More than 60%.

3. Cure Wrinkling

Under the conditions of each of the recording method examples denoted in Table 3, the recorded object recorded using the above recording method was in a cured state according to the evaluation of the curing properties of the ink composition examples described above. The recording portion of the recorded object was evaluated. The evaluation was carried out using visual observation. The evaluation criteria are as follows. The evaluation results are shown in Table 3 below.
A: No wrinkling occurred at all.
B: Wrinkling was observed to have occurred in the region of a portion of the cured film (the cured coating film).
C: Wrinkling was observed over the entire cured film.

TABLE 3

| Recording Method Example | Ink Composition | Ink Temperature | Discharge Stability | Head Durability | Cure Wrinkling |
|---|---|---|---|---|---|
| 1 | 16 | 20° C. | Excellent | C | Poor |
| 2 | | 30° C. | Excellent | C | Poor |
| 3 | | 40° C. | Excellent | C | Poor |
| 4 | | 45° C. | Excellent | C | Poor |
| 5 | 17 | 20° C. | Excellent | C | Poor |
| 6 | | 30° C. | Excellent | C | Poor |
| 7 | | 40° C. | Excellent | C | Poor |
| 8 | | 45° C. | Excellent | C | Poor |
| 9 | 2 | 20° C. | Excellent | A | Fair |
| 10 | | 30° C. | Excellent | B | Fair |
| 11 | | 40° C. | Excellent | C | Fair |
| 12 | | 45° C. | Excellent | C | Fair |
| 13 | 3 | 20° C. | Excellent | A | Excellent |
| 14 | | 30° C. | Excellent | B | Excellent |
| 15 | | 40° C. | Excellent | C | Excellent |
| 16 | | 45° C. | Excellent | C | Excellent |
| 17 | 1 | 20° C. | Poor | A | Excellent |
| 18 | | 30° C. | Excellent | A | Excellent |
| 19 | | 40° C. | Excellent | B | Excellent |
| 20 | | 45° C. | Excellent | C | Excellent |
| 21 | 4 | 20° C. | Poor | A | Fair |
| 22 | | 30° C. | Excellent | A | Fair |
| 23 | | 40° C. | Excellent | B | Fair |
| 24 | | 45° C. | Excellent | C | Fair |
| 25 | 15 | 20° C. | Poor | A | Excellent |
| 26 | | 30° C. | Poor | A | Excellent |
| 27 | | 40° C. | Poor | B | Excellent |
| 28 | | 45° C. | Excellent | C | Excellent |

From the results of Table 3, in the examples which used the ink compositions 2 and 3, in which the viscosity rank of the ink composition used was B, excellent discharge stability and head durability were both obtained at ink temperatures of 20° C. and 30° C. Further, in the examples which used the ink compositions 1 and 4, in which the viscosity rank of the ink composition used was C, excellent discharge stability and head durability were both obtained at ink temperatures of 30° C. and 40° C. Conversely, in the examples which used the ink compositions 16 and 17, in which the viscosity rank of the ink composition used was A, the head durability were both poor at any ink temperatures. In addition, in the examples which used the ink composition 15, in which the viscosity rank of the ink composition used was D, it was not possible to obtain both excellent discharge stability and head durability at any of the ink temperatures. From this, when the viscosity rank of the ink composition used is B or C, it is possible to perform recording such that both excellent discharge stability and head durability are obtained. Furthermore, in the examples which used the ink compositions 16 and 17, in which the viscosity rank of the ink composition used was A, a tendency for the cure wrinkling to also be poor was observed.

3. Ink Accommodation Body Example

An ink pack such as the one in FIG. 1 was produced by preparing various types of film, overlaying them and subjecting the periphery thereof to a heat press. The ink pack was filled with 700 mL of the ink compositions produced in the ink composition examples, the pack was compressed such that air did not enter the ink pack and the ink supply port was sealed in the state in which the volume of pack is as small as possible. The ink accommodation ratio was 90% with respect to the maximum possible ink accommodation capacity when a maximum amount of ink that the pack can accommodate is accommodated. The ink pack was stored in the main body case to obtain an ink cartridge such as the one disclosed in FIG. 1. The main body case was 30 cm long×10 cm high×4 cm deep. The pack types of Table 4 were the types of film that were prepared, and were used as the films below.

EVOH pack: ethylene-vinyl alcohol copolymer (EVAL, manufactured by KURARAY CO., LTD., denoted at EVOH in the table). The thickness was 110 μm. The oxygen permeability was 2.0 cc·20 μm/(m$^2$·day·atm).

PET pack: polyethylene terephthalate (Teijin Tetoron Film, manufactured by Teijin DuPont Films Japan Limited, denoted as "PET" in the table). The thickness was 95 μm. The oxygen permeability was 10.0 cc·20 μm/(m$^2$·day·atm).

AL pack: aluminum vapor deposited PET (denoted as "AL" in the table). 30 μm of aluminum vapor deposited film was provided on 35 μm of thickness of polyethylene terephthalate (Teijin Tetoron Film, manufactured by Teijin DuPont Films Japan Limited). A laminate film was obtained by bonding a film of the same polyethylene terephthalate to the aluminum vapor deposited surface of the film using adhesive. The oxygen permeability was 2.0 cc·20 μm/(m$^2$ day·atm).

The tests of the evaluation items described below were carried out using the produced ink cartridge.

1. Recovery Properties 1 mL of an ink was sampled where the ink cartridge had not yet been subjected to storage, and the ink was diluted by a factor of 5000 with ethyldiglycol acetate. Next, the absorbance (the abs value) of the diluted ink at a wavelength of 500 nm was measured using a spectrophotometer ("Spectrophotometer U-3300", manufactured by Hitachi Co., Ltd.), and this was set to the initial value.

The ink pack was filled with ink, the ink supply port was sealed, the ink cartridge was left to stand such that the side face of the main body case which was 30 cm×4 cm faced the bottom face of the ink cartridge, and was stored at room temperature for 180 days. After the storage, the durability evaluation described below was performed. 1 mL of the ink inside the ink cartridge was sampled where the ink cartridge had been subjected to a precipitation recovery operation, the ink was diluted in the same manner as initially, and the absorbance was measured. The evaluation was performed according to following evaluation criteria.

Excellent: The proportion (%) of the absorbance after storage with respect to the initial value of the absorbance is 99% or more.

Poor: The proportion (%) of the absorbance after storage with respect to the initial value of the absorbance is less than 99%.

2. Durability

The ink cartridge after storage was fixed to a stand such that the side face of the main body case which was 30 cm×10 cm to be the bottom face. Then, the precipitation recovery operation was performed by moving the stand reciprocally over a distance of 20 cm in the direction of the 30 cm side of the main body case. The movement speed was 15 cm/s and the number of reciprocations was as denoted as "stirs" in Table 4. The ink pack of the ink cartridge after storage was removed, and the appearance of the ink pack was observed visually. The evaluation criteria are as follows.

Excellent: No change in the surface of the ink pack.

Poor: Fine cracking is visible on the surface of the ink pack.

3. Discharge Stability

The discharge stability evaluation was performed using the same method as the discharge stability evaluation of the recording method examples described above, except for the details described below. For the ink, the ink inside the ink cartridge of the recovery properties evaluation, both before and after being subjected to storage, which had been subjected to the precipitation recovery operation, was used. If the ink composition used had a viscosity rank in the viscosity evaluation of the ink composition examples described above of A or B, the ink temperature was set to 30° C., if the viscosity rank was C, to 40° C., and if the viscosity rank was D, to 45° C. The evaluation criteria are as follows.

A: There were two or less non-discharging nozzles during the continual discharging.

B: There were 3 or more and less than 10 non-discharging nozzles during the printing discharging.

4. Measurement of Dissolved Oxygen Content

The inks produced in the ink composition examples described above (1 ppm dissolved oxygen content at the time of production) were subjected to ink cartridge storage according to the conditions of the recovery properties evaluation, and measurement of the dissolved oxygen content of the ink inside the ink cartridge after storage was performed using a gas chromatography Agilent 6890 (manufactured by Agilent Technologies). Helium (He) gas was used as the carrier gas. The evaluation criteria are as follows.

A: The dissolved oxygen content is 20 ppm or less.

B: The dissolved oxygen content is more than 20 ppm.

TABLE 4

| Ink Pack Example | Ink Composition | Pack Type | Stirs | Recovery Properties | Durability | Discharge Stability | Dissolved Oxygen Content |
|---|---|---|---|---|---|---|---|
| 1 | 16 | AL | 2000 | Excellent | Poor | A | A |
| 2 | | | 1500 | Poor | Poor | A | A |
| 3 | | | 1000 | Poor | Poor | A | A |
| 4 | | | 500 | Poor | Poor | A | A |
| 5 | | EVOH | 2000 | Excellent | Poor | A | A |

TABLE 4-continued

| Ink Pack Example | Ink Composition | Pack Type | Stirs | Recovery Properties | Durability | Discharge Stability | Dissolved Oxygen Content |
|---|---|---|---|---|---|---|---|
| 6 | | | 1500 | Poor | Excellent | A | A |
| 7 | | | 1000 | Poor | Excellent | A | A |
| 8 | | | 500 | Poor | Excellent | A | A |
| 9 | | PET | 2000 | Excellent | Poor | B | B |
| 10 | | | 1500 | Poor | Excellent | B | B |
| 11 | | | 1500 | Poor | Excellent | B | B |
| 12 | 17 | AL | 1500 | Poor | Poor | A | A |
| 13 | | EVOH | 1500 | Poor | Excellent | A | A |
| 14 | | PET | 1500 | Poor | Excellent | B | B |
| 15 | 2 | AL | 1000 | Excellent | Poor | A | A |
| 16 | | | 500 | Poor | Poor | A | A |
| 17 | | EVOH | 1000 | Excellent | Excellent | A | A |
| 18 | | | 500 | Poor | Excellent | A | A |
| 19 | | PET | 1000 | Excellent | Excellent | B | B |
| 20 | | | 500 | Poor | Excellent | B | B |
| 21 | 3 | AL | 1000 | Excellent | Poor | A | A |
| 22 | | EVOH | 1000 | Excellent | Excellent | A | A |
| 23 | | PET | 1000 | Excellent | Excellent | B | B |
| 24 | 1 | AL | 1000 | Excellent | Poor | A | A |
| 25 | | | 500 | Excellent | Poor | A | A |
| 26 | | | 300 | Poor | Excellent | A | A |
| 27 | | EVOH | 1000 | Excellent | Excellent | A | A |
| 28 | | | 500 | Excellent | Excellent | A | A |
| 29 | | PET | 1000 | Excellent | Excellent | B | B |
| 30 | | | 500 | Excellent | Excellent | B | B |
| 31 | 4 | AL | 1000 | Excellent | Poor | A | A |
| 32 | | EVOH | 1000 | Excellent | Excellent | A | A |
| 33 | | PET | 1000 | Excellent | Excellent | B | B |
| 34 | 15 | AL | 1000 | Excellent | Poor | A | A |
| 35 | | | 500 | Excellent | Poor | A | A |
| 36 | | | 300 | Excellent | Excellent | A | A |
| 37 | | EVOH | 1000 | Excellent | Excellent | A | A |
| 38 | | | 500 | Excellent | Excellent | A | A |
| 39 | | PET | 1000 | Excellent | Excellent | B | B |
| 40 | | | 500 | Excellent | Excellent | B | B |

From Table 4, in the case of the examples in which the ink composition 2, 3, 1 or 4 was used, where the viscosity ranks of the used ink compositions were B or C, and the EVOH pack was used as the pack type of the ink pack, the durability of the pack and the discharge stability were excellent, even when the ink compositions were stirred a number of times sufficient to obtain favorable recovery properties. Conversely, in the examples which used the AL pack as the pack type while using the same inks, it was not possible to obtain excellent durability of the packs when the inks were stirred a sufficient number of times to obtain favorable recovery properties. It was understood that the durability of the packs treated an aluminum vapor deposited film was poor. Furthermore, the cracking which occurred in the AL packs was cracking in the vapor deposited film of the aluminum.

In addition, in the examples which used PET as the pack type while using the inks described above, the discharge stability was poor. In such a case, it was speculated that the dissolved oxygen content was high, and using the inks having a high dissolved oxygen content caused an increase in the occurrence of bubbles within the head. Furthermore, it was speculated that the dissolved oxygen concentration was apt to rise through storage due to the oxygen permeability of the PET pack being greater than that of the EVOH pack. Furthermore, in a case of the examples in which the durability was poor when using the AL pack, since the cracking occurred in the aluminum vapor deposited film, the oxygen permeability of the AL pack became equivalent to that of the PET pack which was the substrate, and if the storage of the cartridge were to be further continued, there is a possibility that the dissolved oxygen content would rise and the discharge stability would deteriorate. In addition, in a case in which the stirring for precipitation recovery is performed during the storage of the cartridge, or in a case in which the cartridge is shaken during transport, durability of the pack is necessary.

Next, in the case of the examples in which the ink composition 16 or 17 was used, where the viscosity rank of the used ink composition was A, in the case of the examples of any of the pack types of ink pack, it was not possible to obtain excellent durability of the pack when the ink compositions were stirred a number of times sufficient to obtain favorable recovery properties. When an ink having poor precipitation resistance is used, it is difficult to obtain both recovery properties and durability. In the case of the examples in which the ink composition 15 was used, where the viscosity rank of the used ink composition was D, and the EVOH pack or AL was used as the pack type of the ink pack, it was possible to obtain excellent durability of the pack even when the ink composition was stirred a number of times sufficient to obtain favorable recovery properties. However, from the results of the recording method examples described above, it is difficult to obtain both discharge stability and head durability when an ink having an ink viscosity rank of D is used.

From the above, in the case of the examples in which the ink composition are used, where the viscosity ranks of the used ink compositions are B or C, and the EVOH pack is used as the pack type of the ink pack, it is possible to obtain an ink accommodation body in which the durability of the pack, the discharge stability and the head durability are excellent even when the ink compositions are stirred a number of times sufficient to obtain favorable recovery properties. Furthermore, if the ink contains a trifunctional or tetrafunctional (meth)acrylate having a pentaerythritol skeleton, it is possible to obtain an excellent ink from the viewpoint of the storage stability and the curing properties of the ink. However, when an ink where this is not the case is used, although it is anticipated that the curing properties and the storage stability will be poor, it is possible to obtain an ink accommodation body in which at least the recovery properties, the durability, the discharge stability and the head durability are excellent by increasing irradiation energy when recording, and lowering the storage temperature, shortening the storage period or the like when storing the ink.

The entire disclosure of Japanese Patent Application No.: 2012-121658, filed May 29, 2012 and 2012-246039, filed Nov. 8, 2012 are expressly incorporated by reference herein.

What is claimed is:

1. An ink jet recording method, comprising: discharging an ultraviolet curing ink jet ink composition from a head to a recording medium at 30° C. to 40° C. to record thereon, wherein the ultraviolet curing ink jet ink composition is a white ink comprising inorganic metal-based fine particles as a color material and has a viscosity of 8 to 20 mPa·s at 20° C., wherein a content of the inorganic metal-based fine particles is 8 to 25 mass % with respect to the total mass of the ultraviolet curing ink jet ink composition, wherein the inorganic metal-based fine particles comprise titanium oxide, and wherein the ink jet composition contains a light radical polymerization initiator, the ink jet ink composition polymerizing by light radical polymerization, the ultraviolet curing ink jet ink composition further comprises a monofunctional (meth)acrylate other than a vinylether group-containing (meth)acrylate having a content of 30 mass % or more with respect to the total mass of the ultraviolet curing ink jet ink composition.

2. The ink jet recording method according to claim 1, wherein the ultraviolet curing ink jet ink composition further comprises a trifunctional or tetrafunctional (meth)acrylate having a pentaerythritol skeleton, a content of the trifunctional or tetrafunctional (meth)acrylate having a pentaerythritol skeleton being 5 to 15 mass % with respect to the total mass of the ultraviolet curing ink jet ink composition.

3. The ink jet recording method according to claim 1, wherein a content of the inorganic metal-based fine particles is 10 to 25 mass % with respect to the total mass of the ultraviolet curing ink jet ink composition.

4. The ink jet recording method according to claim 1, wherein the ultraviolet curing ink jet ink composition further comprises: a vinyl ether group-containing (meth)acrylic ester.

5. The ink jet recording method according to claim 2, wherein the trifunctional or tetrafunctional (meth)acrylate having the pentaerythritol skeleton contains at least one of pentaerythritol tri(meth)acrylate and pentaerythritol tetra (meth)acrylate.

6. The ink jet recording method according to claim 1, wherein a dissolved oxygen content of the ultraviolet curing ink jet ink composition discharged from the head is 20 ppm or less.

7. The ink jet recording method according to claim 1, wherein the monofunctional (meth)acrylate has a content of 40 mass % or more with respect to the total mass of the ultraviolet curing ink jet ink composition.

8. The ink jet recording method according to claim 1, wherein the ultraviolet curing ink jet ink composition further comprises a difunctional or higher order (meth)acrylate having a content of 5 mass % or more with respect to the total mass of the ultraviolet curing ink jet ink composition.

9. The ink jet recording method according to claim 1, wherein the ultraviolet curing ink jet ink composition further comprises an acylphosphine oxide compound as a photoinitator.

10. The ink jet recording method according to claim 1, wherein the ultraviolet curing ink jet ink composition further comprises a difunctional or higher order (meth)acrylate having a content of 20 mass % or less with respect to the total mass of the ultraviolet curing ink jet ink composition.

11. The ink jet recording method according to claim 1, wherein the ultraviolet curing ink jet ink composition further comprises a monofunctional(meth)acrylate having a content of 30 to 50 mass % or less with respect to the total mass of the ultraviolet curing ink jet ink composition.

12. The ink jet recording method according to claim 1, wherein the ultraviolet curing ink jet ink composition has a viscosity of 15 to 20 mPa·s at 20° C.

13. The ink jet recording method according to claim 1, further comprising curing the ultraviolet curing ink jet ink composition discharged to the recording medium by irradiation of ultraviolet rays from an ultraviolet light emitting diode.

14. The ink jet recording method according to claim 13, wherein the ultraviolet rays irradiating the ultraviolet curing ink jet ink composition have an intensity of a peak light emission wave length of 800 mW/cm$^2$ or more.

15. The ink jet recording method according to claim 1, wherein the monofunctional (meth)acrylate other than a vinylether group-containing (meth)acrylate contains one or more of isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-di glycol (meth)acrylate, 2-hydroxybutyl (meth)acrylate, butoxyethyl (meth)acrylate, ethoxy-diethylene glycol (meth)acrylate, methoxy diethylene glycol (meth) acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth) acrylate, lactone-modified flexible (meth)acrylate, t-butylcyclohexyl (meth)acrylate, dicyclopentanyl (meth)acrylate and dicyclopentenyloxyethyl (meth)acrylate.

16. The ink jet recording method according to claim 1, wherein a content of the light radical polymerization initiator is 5 to 20 mass % with respect to the total mass of the ultraviolet curing ink jet ink composition.

* * * * *